United States Patent [19]
Akazawa et al.

[11] Patent Number: 5,474,734
[45] Date of Patent: Dec. 12, 1995

[54] BLOW-MOLDING METHOD FOR RESINOUS MOLDING PRODUCT AND APPARATUS THEREFOR

[75] Inventors: Terumi Akazawa; Takafumi Yamane, both of Hiroshima; Kazunobu Nakamori; Takeyuki Uchida, both of Yokkaichi; Masao Hara, Higashi hiroshima; Kazuhisa Toh, Kure, all of Japan

[73] Assignees: Kabushiki Kaisha Toyo Seat (Toyo Seat Ltd.), Osaka; Nishikawa Kasei Co., Ltd.; Mazda Motor Corporation, both of Hiroshima, all of Japan

[21] Appl. No.: 19,852

[22] Filed: Feb. 19, 1993

[30] Foreign Application Priority Data

| Feb. 27, 1992 | [JP] | Japan | 4-041409 |
| Feb. 27, 1992 | [JP] | Japan | 4-041410 |
| Mar. 24, 1992 | [JP] | Japan | 4-065820 |
| Mar. 30, 1992 | [JP] | Japan | 4-073792 |

[51] Int. Cl.$^6$ .................................................. B29C 49/64
[52] U.S. Cl. ........................... 264/521; 264/520; 264/531; 425/526
[58] Field of Search ..................... 264/520, 521, 264/531, 519; 425/526

[56] References Cited

U.S. PATENT DOCUMENTS

| 3,125,619 | 3/1964 | Miller | 264/520 |
| 3,278,665 | 10/1966 | Harrison | 264/531 |
| 3,452,391 | 7/1969 | Langecker | 264/531 |
| 3,632,713 | 1/1972 | Seefluth | 264/520 |
| 3,892,830 | 7/1975 | Hudson et al. | 264/520 |
| 5,346,665 | 9/1994 | Watanabe et al. | 264/520 |

FOREIGN PATENT DOCUMENTS

| 57-12618 | 1/1982 | Japan . |  |
| 57-80030 | 5/1982 | Japan . |  |
| 58-187318 | 11/1983 | Japan . |  |
| 60-073830 | 4/1985 | Japan | 264/520 |
| 62-48488 | 10/1987 | Japan . |  |
| 1145118 | 6/1989 | Japan | 264/531 |

*Primary Examiner*—Catherine Timm
*Attorney, Agent, or Firm*—Fish & Richardson

[57] ABSTRACT

A parison is hung down between a pair of molding metallic molds in the opened state, expanding members are contacted with the specified portions of the parison, and after setting the temperature difference between the specified portions and other portions in accordance with a pre-set thickness ratio between both portions after forming thereof, the expanding members are moved while cooling the specified portions of expanding members so as to extend and thin the portions other than the specified portions of the parison, and the metallic molds are closed together so as to blow compressed air into the parison to effect blow-molding.

9 Claims, 30 Drawing Sheets

BLOW-MOLDING METHOD FOR RESINOUS MOLDING PRODUCT AND APPARATUS THEREFOR

BACKGROUND OF THE INVENTION

1. Field of the Invention

The present invention relates to a blow-molding method for resinous molding products, and more particularly, a blow-molding method for obtaining a resinous molding product in which specific portions thereof are made thick with respect to the circumferential direction.

2. Description of the Prior Art

Conventionally, the so-called blow-molding method has been generally known as one molding methods for efficiently manufacturing hollow resinous molding products (refer to, for example, Japanese Patent laid open Publication Sho No. 58-23212).

This blow-molding method is arranged to preliminarily mold a thermoplastic resinous material, for example, in a tube shape by extrusion or injection. Compressed air is blown into the inside of the preliminary molded member (parison) in the softened state while placing the parison between metallic molds so as to expand the parison along the molding surface of the metallic molds. The parison is then cooled to solidify the parison, resulting in molded hollow resinous molding products. This process can obtain molding products of stable quality at a high productivity, particularly in the mass production.

Conventionally, the above blow-molding method has been generally employed for molding containers particularly not requiring high strength, for example, containers such as fuel tanks in products for vehicles such as automobiles. In case of such containers, it is desirable to mold in such a way that the thickness of each part becomes as uniform as possible. Various devices and improvements have been made to meet this requirement.

On the other hand, in the field of the so-called structural components where some extent of strength is required, for example, seat frame members for vehicle use, employment of resinous moldings by the blow-molding has been recently tried to achieve further reduction in weight and cost in place of conventional metallic parts (for example, Japanese Patent laid open Publication Sho No. 62-48488).

In case of manufacturing the seat frame by blow-molding, since the seat frame 73 generally has a flat sectional surface as shown in FIG. 40, when a parison 70 extruded in a tubular shape as shown in FIG. 38 is put into the metallic mold as it is and expand-molded by compressed air, it is difficult to cause said parison to closely contact the inner face of the molding die, resulting in failure to obtain sufficient accuracy of molding.

In order to solve such a drawback, there has been tried a process so arranged that a pair of expander pins 71, are put into a cylindrical parison 70 as shown in FIG. 39 as a preliminary step before putting into the molding die. An extended parison 72 is thereby formed through moving said pins in the parting directions (directions indicated by arrows). Thereafter a predetermined blow-molding is effected with a molding die through employment of said expanded parison 72 having a shape close to the product shape.

However, in the case of extending the parison 70 with the extender pins 71 as a preliminary step of the original blow-molding, since the fluidity of said parison 70 is made approximately constant in the whole range, both end portions 72a which are in direct contact with the extender pins 71, 71 so as to directly undergo the extending force is the largest in the extension amount as shown in FIG. 39 and thus, become thin, while the central portions 72b, 72b located between said end portions become thick because of a comparatively small extension amount. Therefore, in the case of forming a seat frame with an extended parison having such a thickness difference by blow-molding, the back supporting portions 73b, 73b located centrally in the width direction are formed thick, while both end portions 73a, 73a are formed thin. In addition, in a seat frame having bank portions largely projecting from the back support portions 73b at both ends, this thinning of the thickness is further facilitated.

On the other hand, generally in the seat frame, since hinge mechanisms are provided on both ends through which to connect the seat frame to the body, both end portions are required to be high in rigidity, while the central portion of the seat frame acting as the back supporting portion is not required to be as rigid as both end portions. From this view-point, it may be said to meet the requirement for strength and weight reduction to form the seat frame to be thick in both end portions and thinner in the central portion.

However, by the conventional method, both end portions 73a which should be formed thick are formed thinner, while the back supporting portion 73b to be formed thin is formed thick. This results in the opposite characteristic to the strength characteristic required for the seat frame.

Furthermore, when the thickness of both end portions 73a are increased to secure the connection strength to the body of such a seat frame, the thickness of the back supporting portion 73b is further increased as a result of said thickness increase. Although the connection strength is secured consequently, this is not desirable because the weight reduction which is the merit of using a resinous material is impaired.

In other words, in this case, it is necessary to increase the thickness only in the both end portions supposed to be subject to a load more than predetermined during use as compared with the central portion acting as the back supporting portion and thereby, to secure the required strength on these specified portions while possibly suppressing the weight increase on the whole.

FIG. 8 is a perspective view of a resinous seat-back frame 25 for automobiles. As shown in FIG. 8, the thickness of both end portions 25a, 25b of the frame 25 is required to be set thicker as compared with that of the central portion 25c.

In order to form such a molded product by a blow-molding method while suppressing the weight increase on the whole, it is required to form a parison in thickness variation in the circumferential direction so that the portions corresponding to the both end portions 25a, 25b of the seat-back frame 25 may become thicker as compared with the other portion (central portion 25c).

In obtaining such a parison varied in thickness so that specified portions are thicker as compared with the other portion, die shaving or core shaving has been conventionally effected on the accumulator head of a parison extruder.

For example, description will be given below, taking the case of core shaving as an example. As shown in FIG. 41, the parison is arranged to be downward extruded from an approximately ring-shaped gap formed between a core 84 having a vertical axial line and a ring-shaped die 83 enclosing said core 84. On the outer peripheral surface of said core 84, shaving is made on the area in which the thickness of the parison is to be made thicker so as to make the gap 85a of said portion larger as compared with other portions.

Therefore, the parison becomes thicker at the portion corresponding to said gap 85a. When blow-molding is conducted onto such a parison, this portion is formed thicker with higher strength as compared with other portion. This secures the required strength on the specified portion of the molding.

However, when the parison is outward extruded from the accumulator head 81 provided with the shaving as described above, since there is a difference in the parison extruding speed between the gap portion 86a where core shaving is effected and the other gap portions 86, when the degree of thickness variation exceeds a predetermined limit, a defect such as the undulated portion 87c may arise on the surface of the parison 87 as shown in FIG. 42 or the parison 87 may be extruded in a bent state.

For this reason, the thickness variation ratio, that is, the ratio of the thickness of the thicker portion to that of the thinner portion is limited to a predetermined range (generally about 1.2) and it is very difficult to obtain a thickness ratio larger than that.

Regarding this problem, the applicant of the present invention has developed the following blow-molding method. Namely, the molding method is arranged so that, as shown in FIG. 43, a parison 97 is extruded preliminarily in such a varied thickness state that thick portions 97a and thin portions 97b are formed in the circumferential direction. A pair of expander members 98 which are movable outward in contact with the thick portions 97a are provided in the inner side of the parison 97. The thick portions 97a are brought into contact with the corresponding molding surfaces of the molding die 93 by moving respective expander members 98 towards the outside of said parison 97 as shown in FIG. 44, thus extending said thin portions 97b. Air is then blown into the parison 97 as shown in FIG. 45.

According to this method, since air blowing is effected in the state where the thick portions 97a, 97a are in contact with the molding die 93 and cooled, the extension of the thick portions 97a, 97a of the parison 97 is suppressed during the extension by blowing and almost only the thin portions 97b, 97b are extended. Therefore, by preliminarily forming the thin portions 97b, 97b to be slightly thicker in consideration of the allowance for the thickness reduction due to the extension, no extreme thickness variation such as performed finally in the resinous molding product is necessary.

By this molding method, such a defect that an undulation portion takes place on the surface of the parison 97 or the parison 97 is extruded in the bent state can be prevented and a molding product having a wide range of thickness variation ratio (thickness ratio) can be obtained. Furthermore, since each thick portion 97a of the parison 97 is secured at the thickness set at the extension process by the expander member 93, the thickness of the thick portion of the molding product can be set at a high accuracy.

By employment of the above-described method, even in the case where a parison is formed almost uniformly in thickness in the circumferential direction, namely, a parison is extruded downwards in the form of the so-called uniform thickness parison, a molding product in which a specific portion is formed thicker can be obtained. Namely, in this case, a parison can be extruded downwards without the possibility of defects such as the surface undulation or other deformations of the parison, and further, a wide range of thickness variation ratio can be given to the molding product.

Meanwhile, the above-described method is so arranged that, by bringing the expander members into contact with the specific portions (thick portions 97a) of the parison 97, the specific portions 97a are cooled and solidified to suppress the flow of the resinous material at these portion. In the state where the original thickness of said specific portions is retained as far as possible, portions (thin portions 97b) other than the specific portions 97a of the parison 97 are extended. The thickness difference between the specific portion 97a of the parison 97 and the other portion 97b caused by this extension determines the thickness variation ratio of the molding.

The extent to which the thickness difference between the specific portion 97a and the other portion 97b is secured depends largely upon the temperature difference between both portions 97a and 97b at the time of extension. Therefore, how to set the temperature difference is very much important for securing a predetermined thickness ratio on the molding.

Furthermore, in order to provide a predetermined thickness ratio on the molding, it is important to effectively cool and solidify the specific portion 97a.

However, when the specific portion 97a is cooled and solidified too excessively, the moldability of this portion at the blow-molding after extension is impaired, resulting in the probability of yielding defective moldings.

Furthermore, there has been such a problem that when the temperature at the surface of the specific portion 97a contacted by the expanding member 98 is too low and solidified excessively, both members become easy to stick to each other, which worsens the separability in separating the expanding member 98 from the contact portion of the specific portion 97a after completion of the extension process.

On the other hand, in obtaining moldings in which the specific portions are made thicker, if the range of thick thickness formation can be adjusted to increase or decrease, it is very convenient for designing and manufacturing various moldings having different requirements for the range of thick thickness formation.

SUMMARY OF THE INVENTION

The present invention has been developed with an object of providing a blow-molding method which is capable of securing a predetermined thickness ratio of a molding, securing moldability of thick portions and separability of expanding members, and adjusting to increase or decrease the range of thick thickness formation in extending a parison so as to blow-mold a molding product wherein specified portions thereof are of thick thickness, and an apparatus employed therefor.

In order to achieve the aforementioned object, according to a first aspect of the present invention, there is provided a blow-molding method for resinous molding products which have thick portions and thin portions with respect to the circumferential direction. This method comprising the steps of:

Hanging down a parison which has a predetermined sectional figure in a first temperature between a pair of metallic molds which are free to open or close together.

Contacting at least one pair of expanding members with the specified portions of the parison corresponding to the thick portions after molding. The expanding members being movable in directions of extending portions other than the specified portions of the parison. The other portions of the parison corresponding to the thin portions after molding.

The expanding member being provided with a temperature conditioning means capable of adjusting the specified portions of the parison to a second temperature that is lower than the first temperature by contacting the expanding members. And the operations of the temperature conditioning means being controled by a controlling means for setting the temperature difference between the first temperature of the other portions and the second temperature of the specified portions of the parison.

Thinning of the thickness of the portions other than the specified portions of the parison by moving the expanding members in the directions of extending the other portions, after setting the temperature difference between the first temperature and the second temperature in the movement of the expanding members in accordance with the preset thickness ratio between both the specified portions and the other portions of the parison to be secured after molding of both portions.

Closing together the pair of metallic molds and blowing compressed air into the parison so as to conduct blow-molding.

In addition, according to a second aspect of the present invention, there is provided a blow-molding method for resinous molding products which is characterized in that, in the blow-molding method according to the first aspect of the present invention, the parison is a so-called varied thickness parison and the expanding members are brought into contact with the thick portions of the varied thickness parison.

According to a third aspect of the present invention, there is provided a blow-molding method for resinous molding products wherein the parison is an uniform thickness parison which is formed approximately uniform in thickness in the circumferential direction and the temperature difference between the first temperature and the second temperature of the uniform thickness parison at the movement time of the expanding members is set larger than in the case where the parison is a varied thickness parison.

Further, according to a fourth aspect of the present invention, there is provided a blow-molding method for resinous molding product which comprises the following steps in the molding method according to the first aspect of the present invention:

A step of extending portions other than the specified portions in thinning the other portions by moving the expanding members up to intermediate positions before the specified portions of the parison come into contact with the molding surface of the metallic molds.

A step of heating the contact surface portions of the parison contacted by the expanding members until the temperature thereof reach a predetermined temperature.

And, a step of closing together the pair of metallic molds after taking out the expanding members therefrom, and thereafter, blowing compressed gas into said parison to effect blow-molding.

According to a fifth aspect of the present invention, there is provided a blow-molding method for resinous molding products which is characterized in that, in the blow-molding method according to the fourth aspect of the present invention, the temperature conditioning means is provided with heating means for heating the contact surface portions of the parison contacted by the expanding members, cooling means for cooling the contact surface portions of the parison and switching means for switching the operations of both means. The switching means are arranged to switch the operating states of the both means so as to operate said cooling means until the extension process for portions other than the specified portion of the parison is completed, and operate the heating means upon completion of the extension process.

According to a sixth aspect of the present invention, there is provided a blow-molding method for resinous molding products which is characterized in that, in the blow-molding method of the fourth aspect of the present invention, the parison is an uniform thickness parison.

According to a seventh aspect of the present invention, there is further provided a blow-molding method characterized in that, in the blow-molding method of the first aspect of the present invention, the adjustment of the thickness in the other portions of the parison is effected by cooling the other portions contacted by the expanding members in the extension process of the parison.

According to an eighth aspect of the present invention, there is provided a blow-molding method characterized in that in the blow-molding method of the first aspect, parison portions other than the contact surface portions contacted by expanding members are extended by the expanding members arranged on the outer side of the parison and having sucking means for the parison.

According to the ninth aspect of the present invention, there is provided a blow-molding method which is characterized in that, in the method of the first aspect of the present invention, the contact surface portions of the parison contacted by expanding members are provided with a plurality of bead portions extending in a predetermined direction.

According to a tenth aspect of the present invention, there is provided a blow-molding apparatus for resinous molding products which have thick portions and thin portions with respect to the circumferential direction comprising:

A pair of metallic molds arranged to be attached to or separated from each other and forming a predetermined molding space within the metallic molds in the attached state.

An extruder for extruding thermoplastic resinous material as a parison which has a predetermined sectional figure in a first temperature between the metallic molds in the separated state.

At least a pair of expanding members arranged confrontingly so as to approach or part each other with contact surfaces of a predetermined dimension being provided on the sides confronting said parison in the approaching or parting direction, and extending portions other than the specified portions in the state where the contact surfaces are in contact with the specified portions of the parison by the approaching or parting action thereof. The specified portions of the parison being corresponding to the thick portions after molding, and the other portions being corresponding to the thin portions after molding.

A temperature conditioning means provided on the expanding member so as to be movable approximately integrally with the expanding member and capable of adjusting the temperature of the specified portion of the parison contacted by the contact surface of the expanding member to a second temperature that is lower than the first temperature.

A controlling means for setting the temperature difference between the first temperature of the other portions and the second temperature of the specified portions at the movement time of the expanding member in accordance with the pre-set thickness ratio between both portions to be secured after formation of both portions.

And, a compressed air supplying means for supplying compressed air into the extended parison accommodated in the molding space of the metallic molds so as to expand the parison in a shape conforming to the inner surface of the molding space, thus to obtain resinous molding products of a predetermined shape.

According to an eleventh aspect of the present invention, there is provided a blow-molding apparatus for resinous molding products which is constituted so that, in the blow-molding apparatus of the tenth aspect of the present invention, the temperature conditioning means is provided with a heating means for heating the contact portions of the expanding members, a cooling means for cooling the contact portions of the expanding members and a switching means for switching the operations of both means. The switching means is arranged to operate the cooling means until the extension process is completed and to operate the heating means on completion of the extension process.

According to a twelfth aspect of the present invention, there is provided a blow-molding apparatus for resinous molding products which is so constituted that, in the blow-molding apparatus of the 10th aspect of the present invention, the temperature conditioning means is composed of a first cooling means provided for cooling the specified portions of the parison contacted by the expanding members and a second cooling means provided in the vicinity of the parison for cooling portions other than the specified portions of the parison.

Further according to a thirteenth aspect of the present invention, there is provided a blow-molding apparatus which is so constituted that, in the blow-molding apparatus according to the tenth aspect of the present invention, the pair of expanding members are disposed on the outer side of the parison, and each of the expanding members is provided with a sucking means for sucking the parison onto the contact surface so as to hold the parison in contact therewith.

Further according to a fourteenth aspect of the present invention, there is provided a blow-molding apparatus which is characterized in that, in the blow-molding apparatus according to the tenth aspect of the present invention, the expanding member is formed with a plurality of grooves extending in a predetermined direction on the contact surface thereof.

According to the first aspect of the present invention, since the temperature difference between the first temperature of the specified portions of the parison and the second temperature of the other portions at the movement time of the expanding members is set in accordance with the pre-set thickness ration to be secured after formation of both portions. The larger the pre-set thickness ratio is, the earlier the cooling and solidification of the specified portions contacted by expanding members is expedited, as compared with the other portions. Therefore, when the portions other than the specified portions are extended to become thinner in thickness, the fluidity of resinous material at the specified portions is more strongly restricted so as to hold the thickness at these portions in the state more close to the original thickness.

In other words, by setting the temperature difference in accordance with the pre-set thickness ratio, the larger pre-set thickness ratio is, the larger the thickness difference between the specified portions and the other portions can be made. Even in the case of molding a molding product, such as a construction member requiring a large thickness ratio, a desired thickness ratio can be securely imparted.

Meanwhile, according to the second aspect of the present invention, since the parison is a so-called varied thickness parison and the expanding members are contacted with the thick portions of the parison in the method according to the first aspect of the present invention, the same effect as in the first aspect of the present invention can be exhibited. Further, since the thickness difference of the parison itself in the hang-down state can be also utilized, a larger thickness ratio can be imparted to a molding product.

Furthermore, according to the third aspect of the present invention, since the parison, is a so-called uniform thickness parison in the first aspect of the present invention, and the temperature difference at the movement time of expanding members is set larger than in the case of a varied thickness parison, the same effect as in the first aspect of the present invention can be exhibited in the case of hanging down an uniform thickness parison. By using a uniform thickness parison, occurrence of such a trouble as the surface undulation or deformation of the parison can be prevented, and the same thickness ratio as in the case of a varied thickness parison can be given to the molding product.

Further, according to the fourth aspect of the present invention, since it is so arranged that after extending portions other than the specified portions of a parison by moving the expanding members up to intermediate positions before the specified portions of the parison contact the metallic molds, the contact surface portions of the parison are heated until the temperature thereof reach a predetermined temperature before closing the metallic molds to effect blow-molding, the blow-molding is not conducted in the state where the specified portions of the parison are cooled and solidified excessively but the moldability of the specified portions can be secured well. Furthermore, wherein the expanding members are taken out of the parison, the separability of the expanding members from the contact surface portions of the specified portions of the parison can be well secured.

In this case, the same as in the method according to the first aspect of the present invention, the specified portions are expedited in cooling and solidification thereof by the expanding members until the extension process of the portions other than the specified portions is completed. Therefore, when portions other than the specified portions are extended so as to become thin in thickness, the fluidity of material resin at the specified portions is restricted so as to maintain the thickness at these portions at a state close to the original thickness.

In other words, a pre-determined thickness ratio can be securely imparted to the molding product. Further, the occurrence of defective molding products can be prevented by excellently securing the moldability of the thick portions. The adhesion of the parison to the contact surface portions of the expanding members can be securely prevented by excellently securing the separability of the expanding members.

Furthermore, according to the fifth aspect of the present invention, since the heating means, cooling means and switching means are provided on the temperature conditioning means in the method according to the fourth aspect of the present invention, and the switching means is arranged to switch the operating state of both means so as to operate the cooling means until the completion of the parison extension process and to operate the heating means on completion of the extension process, the structure and operation of the molding apparatus can be simplified and the cycle time thereof can be shortened as compared with the case where cooling means and heating means are provided separately from expanding members.

Furthermore, according to the sixth aspect of the present invention, since the parison is made a so-called uniform thickness parison in the method of the fourth aspect of the present invention, the same effect as in the fourth aspect of the present invention can be exhibited. Further, troubles such as surface undulation and deformations of the parison during hang-down of the parison can be eliminated.

Further according to the seventh aspect of the present invention, since portions other than the contact surface portions of the parison contacted by the expanding members are cooled during the extension process for the parison, the other portions are gradually reduced in thickness while being cooled sequentially. Therefore, by properly adjusting the cooling time and the degree of cooling, the thickness of the extended portions continued with the thick portions and the range of the thick thickness formation can be adjusted to be increased or decreased in accordance with needs. Namely, the same effect as in the first aspect of the present invention can be exhibited and moreover, the range of the thick thickness formation and the state of thickness variation can be adjusted arbitrarily. Thus, it becomes possible to properly meet various thickness requirements according to kinds and shapes of molding products.

Further according to the eighth aspect of the present invention, since portions of the parison other than the contact portions with expanding members are extended by expanding members having suction means for the parison disposed on the outer side thereof, the circumferential length of each expanding member is less restricted by the diametral dimension of the parison, and the freedom in setting the range of thick thickness formation can be increased.

Additionally, according to the ninth aspect of the present invention, since the parison is provided with a plurality of bead portions extending in a pre-determined direction on its contact surface portions with expanding members, the contact portions are further increased in rigidity as the synergical effect of thickening of the thickness by the contact of expanding members and the presence of the bead portions.

Meanwhile, in the blow-molding apparatus for resinous molding products according to the tenth aspect of the present invention, since the metallic molds, extruder, expanding members, temperature conditioning means and compressed air supplying means are provided and the controlling means for setting the temperature difference at the movement time of the expanding member in accordance with a pre-set thickness ratio between the specified portions and the other portions of the parison to be secured after formation thereof, the larger is the set thickness ratio is, the larger the thickness difference between the specific portions of the parison and other portions can be made. Even in the case of molding products such as construction members which require a large thickness ratio, a desired thickness ratio can be easily imparted.

Furthermore, according to the eleventh aspect of the present invention, since the temperature conditioning means is provided with the heating means, cooling means and switching means in the blow-molding apparatus according to the tenth aspect of the present invention, until the completion of the parison extension process, the cooling and solidification of the contact portion of the parison can be expedited by the operation of the cooling means. When the extension process is completed, the moldability of the contact portions and the separability thereof when expanding members are separated therefrom can be well secured. In other words, a pre-determined thickness ratio can be imparted to the molding product. Further, occurrence of defective molding products can be prevented with good moldability of thick portions being secured and the adhesion to the parison of expanding members can be positively prevented with good separability thereof.

Further according to the twelfth aspect of the present invention, since, in the blow-molding apparatus according to the tenth aspect of the present invention, the temperature conditioning means is provided with a first cooling means for cooling the specified portions of the parison contacted by the expanding members and a second cooling means for cooling portions other than the specified portions of the parison, by cooling the portions not contacting the contact surfaces of the expanding members, namely, intermediate portions not cooled by the first cooling means by the second member provided separately from the first cooling member in forming the extended parison by the expanding members, the intermediate portions are gradually extended while being cooled so as to be gradually reduced in thickness. In this case, by adjusting the cooling time or degree of cooling by the second cooling means, it becomes possible to adjust to increase or decrease the thickness and the range of thick thickness formation of the intermediate portions connected to both end portions.

Therefore, since the same effect as in the tenth aspect of the present invention can be exhibited. Furthermore, the thick thickness range and the variation state for resinous molding products can be adjusted at will. The thickness requirements according to kinds and shapes of resinous molding products can be met precisely, which leads to increased generality of the apparatus.

Further according to the thirteenth aspect of the present invention, since, in the blow-molding apparatus according to the tenth aspect of the present invention, the pair of expanding members are disposed on the outer side of the parison and each expanding member is provided with a sucking means for sucking the parison onto its contact surface and holding the same in contact therewith, by approaching the contact surfaces of expanding members to each other in the state where the expanding members are positioned outside the parison so as to put the parison therebetween, and adjusting the temperature at the contact surface portions at a predetermined temperature in the state, the parison can be sucked onto the contact surface portions and held thereon by the sucking means. Thereby, a desired thickness ratio can be securely imparted on the molding product as in the case of the tenth aspect of the present invention. Moreover, since the expanding members are disposed on the outer side of the parison so as to contact the parison from the outer side thereof, the length of each expanding member in the circumferential direction is less restricted by the diametral dimension of the parison, and the freedom in setting the range of thick thickness formation can be increased.

Furthermore, according to the fourteenth aspect of the present invention, since a plurality of grooves extending in a predetermined direction are formed on the contact surfaces of the expanding members in the blow-molding apparatus according to the tenth aspect of the present invention, the contact surface portions of the parison contacted by expanding members are formed with a plurality of bead portions extending in the predetermined direction. By the synergical effect of the existence of the bead portions and thick thickness formed by contact of the expanding members, the contact portions of the parison by expanding members, namely, the thick portions of the molding product are further increased in rigidity.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

[Embodiment 1]

Hereinbelow, the present invention will be described with respect to the embodiments applied to the blow-molding of a seat-back frame for automobile seats with reference to the accompanying drawings.

Figure 1:
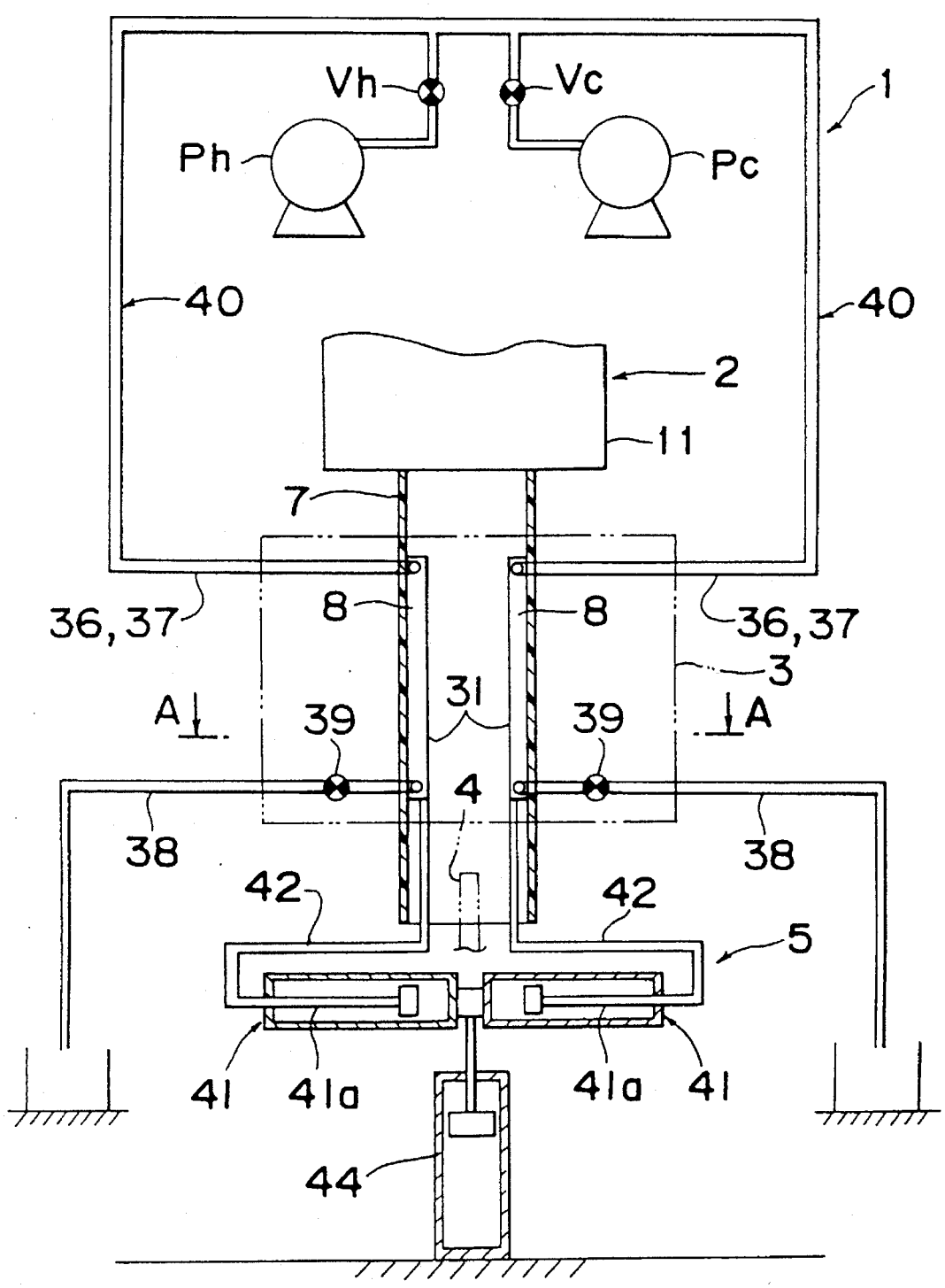
FIG. 1 is an overall construction view showing the outline of a blow-molding apparatus according to the first and second embodiments of the present invention.

FIG. 1 is an overall construction drawing schematically showing the overall construction of a molding apparatus for effecting a blow-molding method according to a first embodiment of the present invention. As shown in FIG. 1, the blow-molding apparatus 1 according to the present embodiment is primarily composed of a parison extruder 2 for preliminarily molding a predetermined thermoplastic resinous material into a tube-shaped form so as to extrude downwards as a parison 7 in the softened state, a molding die 3 for forming the parison 7 hanging down from the accumulator head 11 of parison extruder 2, an air blowing device 4 for blowing compressed air into the interior of the parison 7 held within molding die 3, expander panels 8 for varying the thickness of the parison 7 in the circumferential direction, and an expander member driving device 5 for driving expander panels 8.

Figure 2:
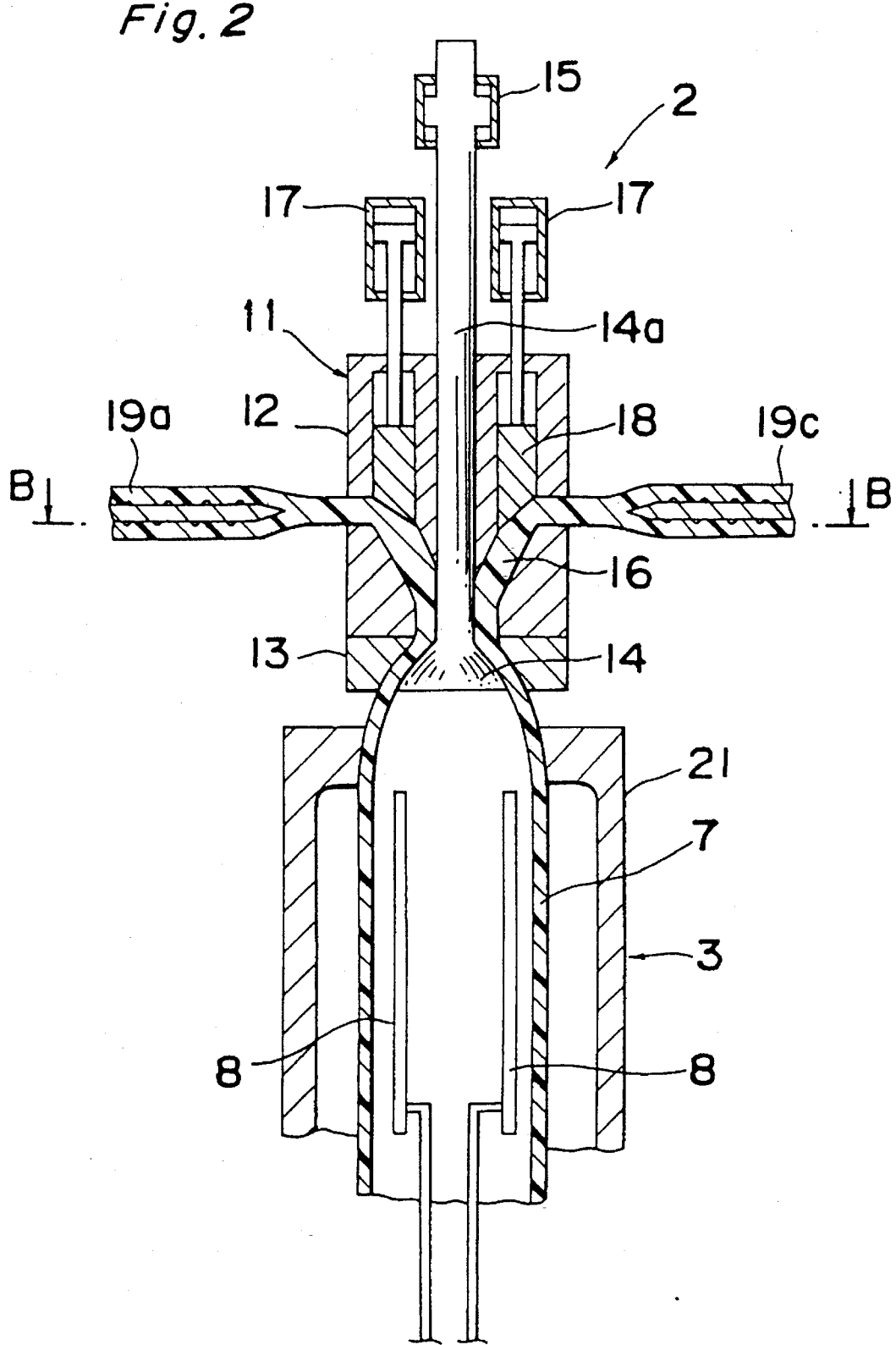
FIG. 2 is an explanatory longitudinal sectional view of the parison extruder of the blow-molding apparatus.

On accumulator head 11 of the parison extruder 2, as shown in FIG. 2, a ring-shaped die 13 for forming the outer peripheral side of the parison 7 is provided on the lower end of the main body 12 thereof. On the central position of die 13, there is provided a core 14 for forming the inner peripheral surface of the parison 7. Core 14 is arranged to adjust and set the distance from die 13 (namely, the thickness of the parison 7) by driving the core rod 14a up and down with a cylinder device 15 provided above the accumulator head 11.

On the outer peripheral portion of the core rod 14a in main body 12, there is formed an annular material storage portion 16. On the upper side of material storage portion 16, there are arranged plungers 18 driven up and down by cylinders 17.

Figure 3:
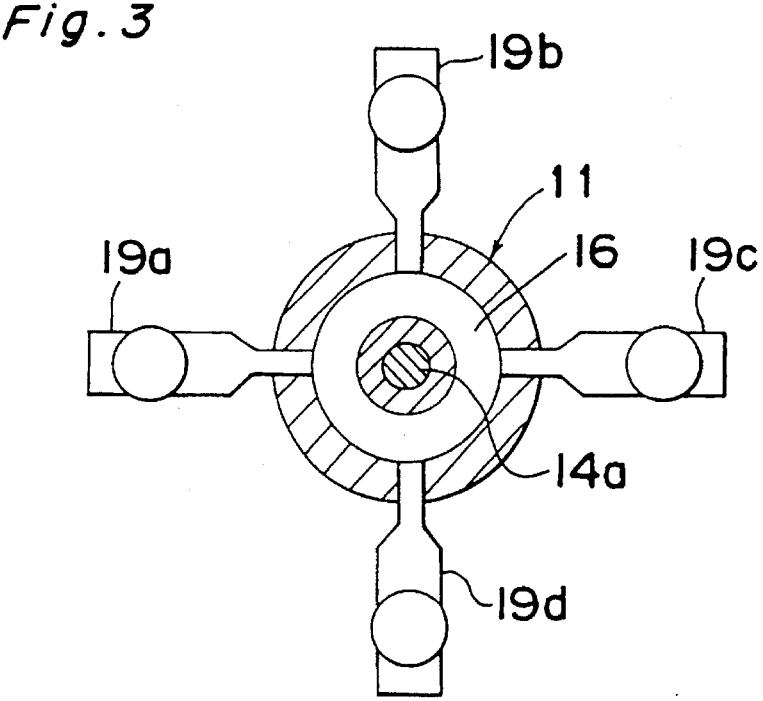
FIG. 3 is an explanatory sectional view along the line B—B in FIG. 2.

A plurality (for instance, 4 units) of material supplying units 19a to 19d for supplying molten resin material to the material storage portion 16 are connected to said material storage portion 16 as shown in FIG. 3. These material supplying units 19a to 19d are arranged equidistantly in a circle so as to supply resinous material supplied from a hopper (not shown) to the material storage portion 16 from back- and-forth and right-and-left.

Figure 6:
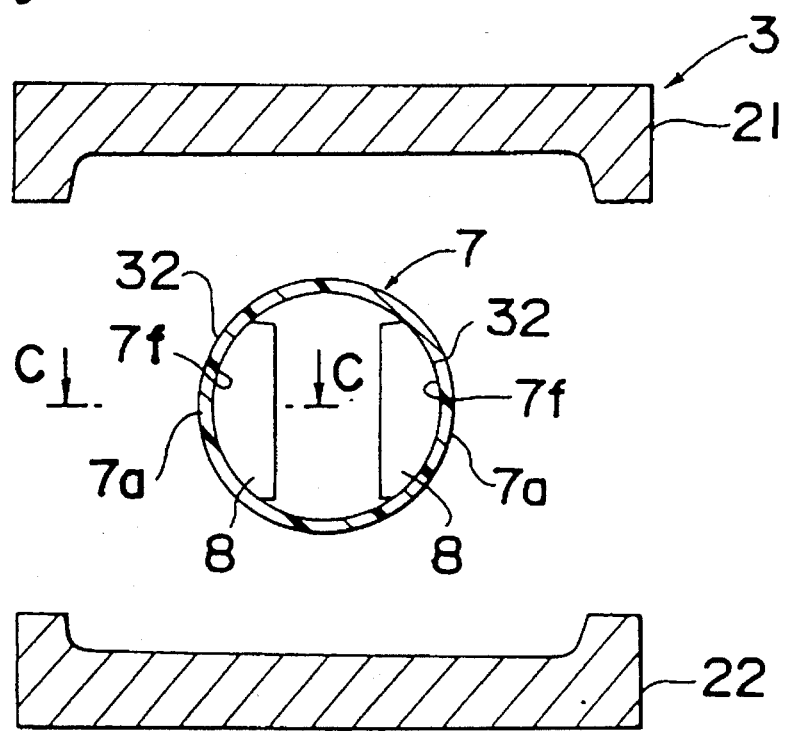
FIG. 6 is an explanatory sectional view along the line A—A in FIG. 1.

Molding die 3 is composed of, as shown in FIG. 6, a pair of split metallic molds, for example a fixed mold 21 and a movable mold 22. By closing together both split molds 21, 22, a cavity corresponding to the outer shape of a predetermined molding product to be molded by the blow-molding is formed.

Figure 8:
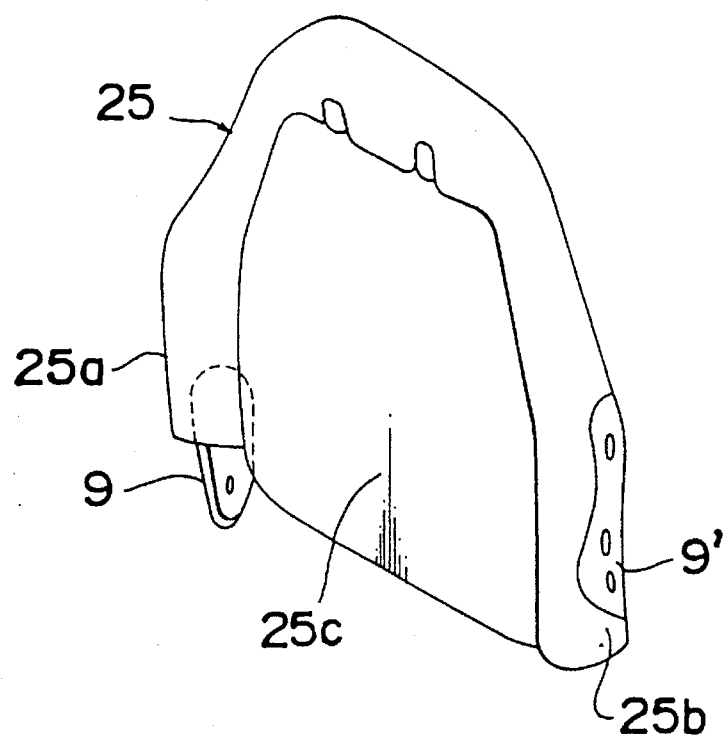
FIG. 8 is a perspective view of a seat-back frame for an automobile seat according to the embodiments.

The present embodiment is intended to blow-mold, for example, a seat-back frame for automobile seats, and by closing together both split molds 21, 22, a cavity corresponding to the outer shape of the seat-back frame as shown in FIG. 8 is formed.

In the present embodiment, seat-back frame 25 is set so that the thickness at both side portions 25a, 25b is thicker at a predetermined thickness ratio as compared with the thickness at the central portion 25c.

Furthermore, on the left and right lower side faces, steel brackets 9, 9' are integrally installed to connect the seat-back frame 25, for example, to frame members (not shown) on the side of the seat cushion. These brackets 9, 9' can be also fixed to the specified positions of the seat-back frame by inserting as insert fittings in the blow-molding process.

Figure 4:
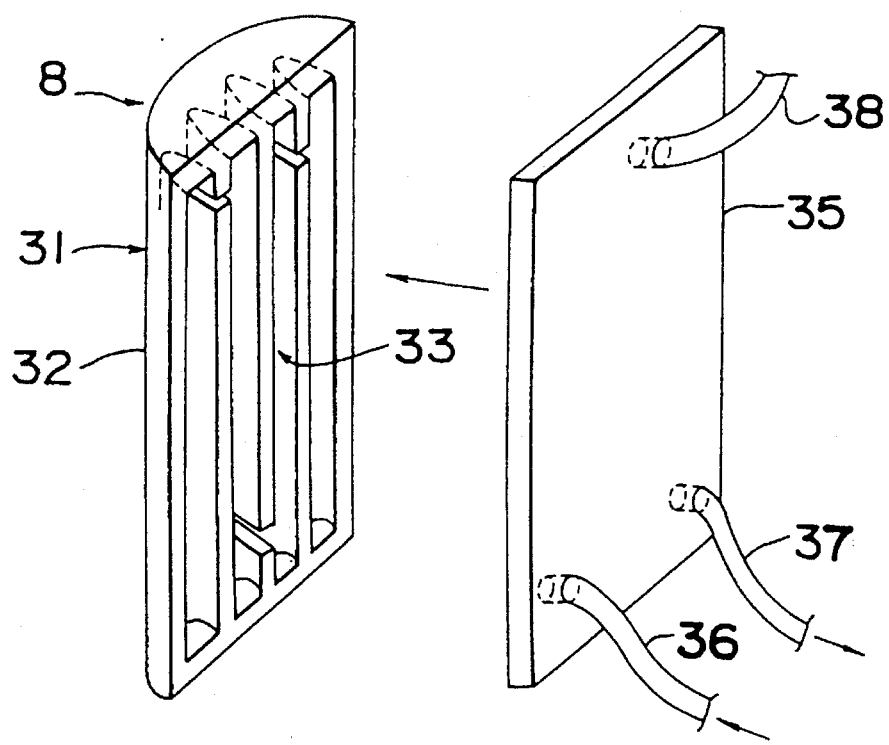
FIG. 4 is an exploded perspective view of an expander panel of the blow-molding apparatus.
Figure 5:
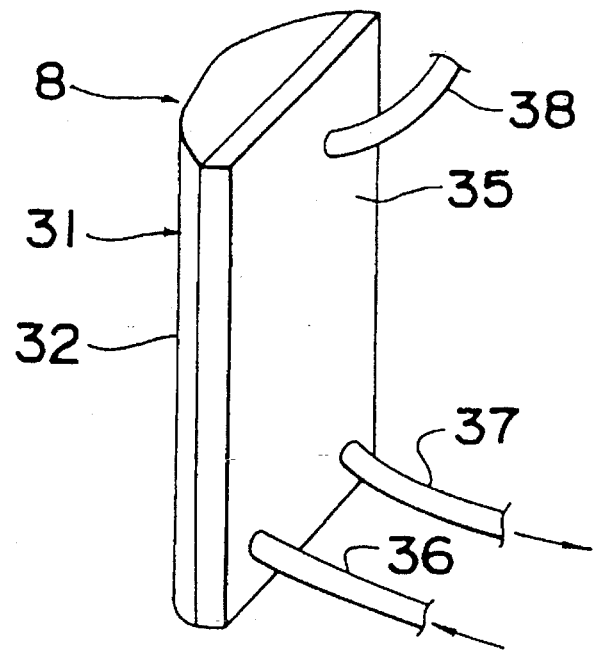
FIG. 5 is an overall perspective view of the expander panel on the whole.

Said expander panel 8 is composed, as shown in FIGS. 4 and 5, of a temperature conditioning unit 31 having a curved portion 32 of a curvature approximately corresponding to the inner peripheral surface of the parison 7 on its peripheral surface with a series of grooves for passing a temperature controlled fluid (chilled water or hot water) being provided therein and a back panel 35 having a supply tube 36 and a discharge tube 37 for supplying and discharging the fluid in the grooves, and assembled by overlapping the back panel 35 on the back face of the temperature conditioning unit 31 with a predetermined sealing member (not shown) being put therebetween and tightly fixing, for example, with screws.

Furthermore, on the up-stream sides of the supply tube 36 and discharge tube 37, a hot water pump Ph and a cooling water pump Pc are connected, respectively through change-over valves Vh and Vc (refer to FIG. 1), and in accordance with the change-over state of the change-over valves Vh and Vc, hot water or cooling water conditioned at a predetermined temperature is supplied to the temperature conditioning unit 31, and the surface temperature of the curved surface portion 32 of the temperature conditioning unit 31 can be kept at a desired temperature by circulating said hot or cooling water through a series of passages 40 including grooves in the temperature conditioning unit 31.

For example, to cool the specific portion of the parison 7 with the expander panel 8, the change-over valve Vh for hot water is closed and change-over valve Vc for chilled water is opened, whereby the cooling water pump Pc is changed over to be connected to the passage 40. Meanwhile, to heat the specific portion, the open and closed states of the respective change-over valves Vh, Vc are changed, whereby the hot water pump Ph is connected to the passage 40.

Further, on the back face side of temperature conditioning unit 31, a drain tube 38 for discharging the hot water or cooling water circulating through series of passages 40 including grooves 33 of temperature conditioning unit 31 is connected thereto. By opening a drain valve 39 provided on drain tube 38, the circulation water in the passage 40 can be discharged outside.

In the first embodiment, the change-over valves are normally changed over to connect the cooling water pump to the passage so that the inner peripheral side of the specific portion of the parison 7 is cooled by expander panel 8.

The expander member driving device 5 for driving expander panel 8 is arranged to drive one set of expander panels 8 which are disposed, for example, as a left-and-right pair. A pair of left and right lateral cylinders 41 is provided for driving respective expander panels 8 to part or approach each other in the direction (lateral direction) approximately normal to the central axis of the parison 7 and a vertical cylinder 44 for moving these two lateral cylinders in the vertical direction. Each of said expander panels 8 is connected to the piston rod 41a of said each lateral cylinder 41 through an approximately L-shaped arm member 42.

Subsequently, the blow-molding method executed through employment of blow-molding apparatus 1 having the construction as described above will be concretely described with reference to a series of process explanatory drawings.

Figure 9:
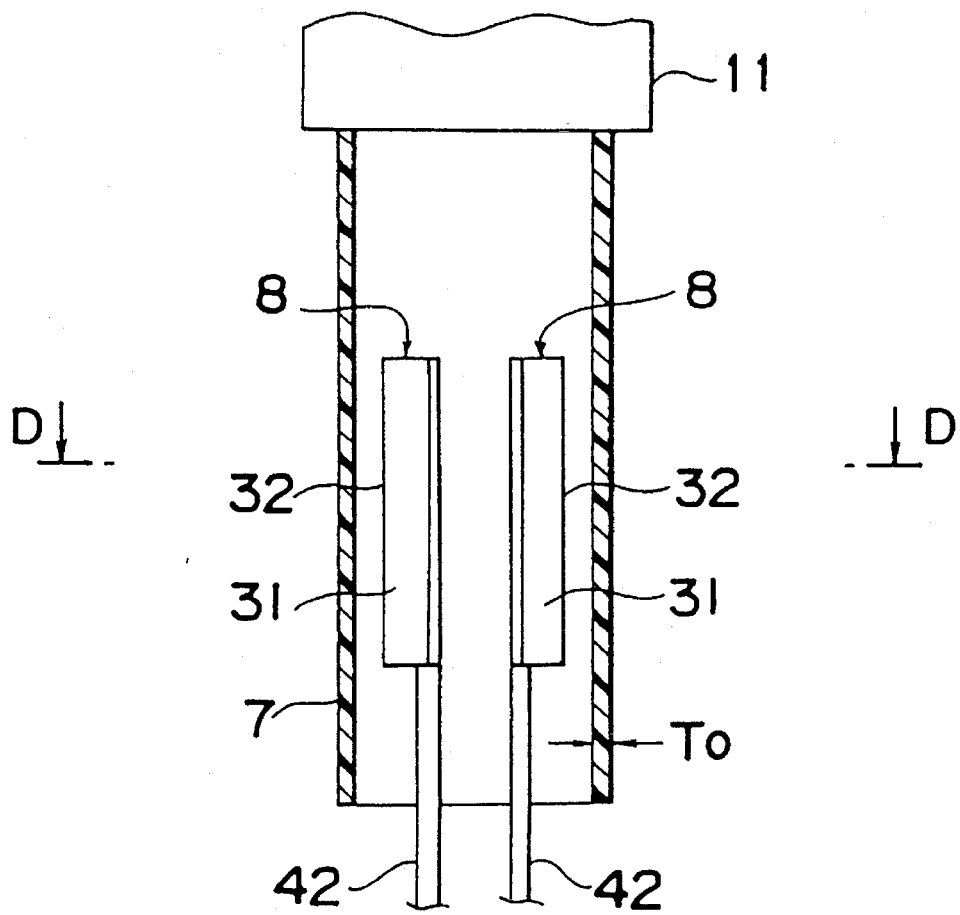
FIG. 9 is an explanatory process drawing showing the state before the expander panels are brought into contact with a parison in the blow-molding method according to the embodiments.
Figure 10:
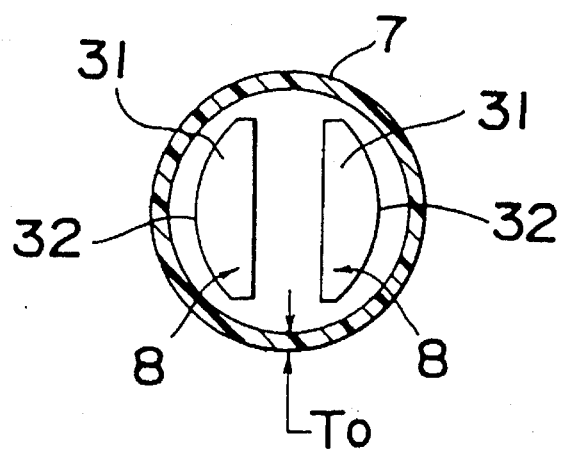
FIG. 10 is an explanatory sectional view along the line D—D in FIG. 9.

In the first place, the parison 7 is extruded downwards from the accumulator head 11 of the parison extruder 2, and the expander panels 8 are positioned in the inner side of the specific portions of the parison 7 as shown in FIGS. 9 and 10 by activating expander member driving device 5.

It is to be noted here that the parison 7 may be extruded downward after setting expander panels 8 at the specified positions.

Parison 7 may be either an uniform thickness parison, wherein the thickness is formed approximately uniform in the circumferential direction, or a varied thickness parison, wherein the thickness is varied in the circumferential direction. In the present concrete example, description will be made of the case where the parison 7 is an uniform thickness parison referred to above.

Namely, in the present concrete example, the parison 7 is set to hang down, for example, in the state where the thickness $T_o$ is about uniform in the circumferential direction. By forming the parison 7 as a uniform thickness parison, the parison can be hung down without causing the undulation of the surface or deformations thereof as experienced in the case of hanging down a parison by varying its thickness.

Figure 11:
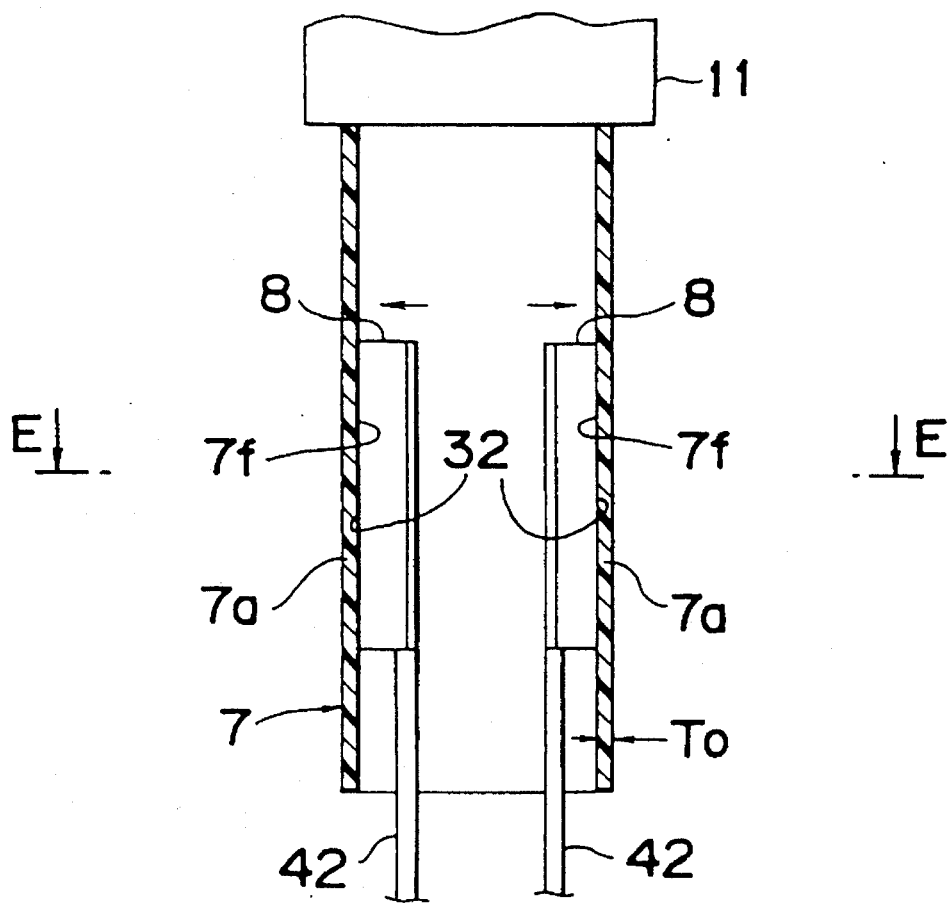
FIG. 11 is an explanatory sectional view showing the state where the expander panels are in contact with the parison at its specific positions in the blow-molding method.
Figure 12:
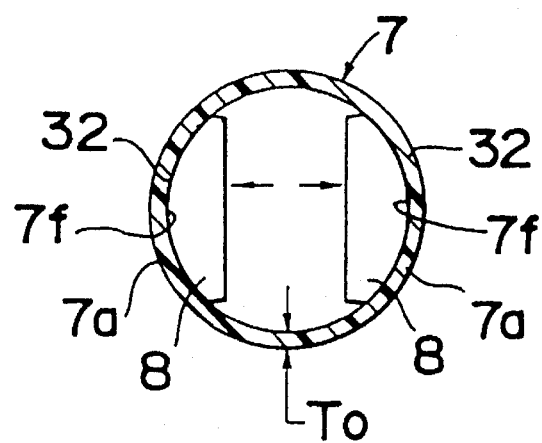
FIG. 12 is an explanatory sectional view along the line E—E in FIG. 11.

Next, both expander panels 8 are driven in the direction of parting each other (towards the outside of the parison). As shown in FIGS. 11 and 12, the curved portions 32 of the temperature conditioning units 31 of respective expander panels 8 are brought into contact with the inner peripheral surface at the left and right specified positions 7a of the parison.

Figure 7:
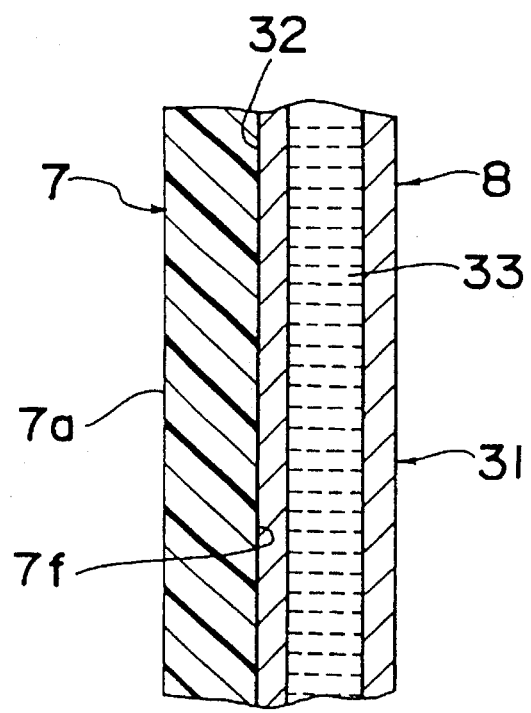
FIG. 7 is an explanatory sectional view along the line C—C in FIG. 6.

This state is the same as shown in FIGS. 1, 6 and 7. Respective specified positions 7a of the parison 7 are heat exchanged by cooling water flowing through the groove portion 33 in the temperature conditioning units 31 by contacting the curved portions 32 of temperature conditioning units 31 to be immediately cooled and solidified starting from the inner peripheral portions 7f contacted by the expander panels 8 (refer to FIG. 7).

In the present embodiment, as will be described in detail later, by adjusting the surface temperature of the curved portion 32 of the temperature conditioning unit 31 through proper control of the temperature and flow rate of the cooling water, the temperature of the specified position 7a of the parison 7 can be set at a predetermined value.

Next, in the state where respective expander panels 8 are in contact with the inner peripheral surface portions 7f of the specified portions 7a of the parison 7 as described above, as shown in FIG. 13 and 14, expander panels 8 are simultaneously moved by a predetermined amount towards the outside of the parison in the horizontal plane to extend the portions 7b other than specified portions 7a of the parison 7, thus reducing its thickness.

At this time, since respective specified portions 7a have been sufficiently solidified and portions 7b other than specified portions 7a are cooled and solidified during the extension process, the specified portions are suppressed in fluidity of resin material and maintained at a thickness approximately equal to the original thickness $T_o$ during the extension process.

Next, when the expander panels 8 reach the predetermined positions and portions 7b other than the specified portions of the parison 7 are extended by the predetermined amount, the outward movements of expander panels 8 are stopped. Thereafter, expander member driving device 5 is activated to lower expander panels 8 below the lower end of the parison 7.

Figure 15:
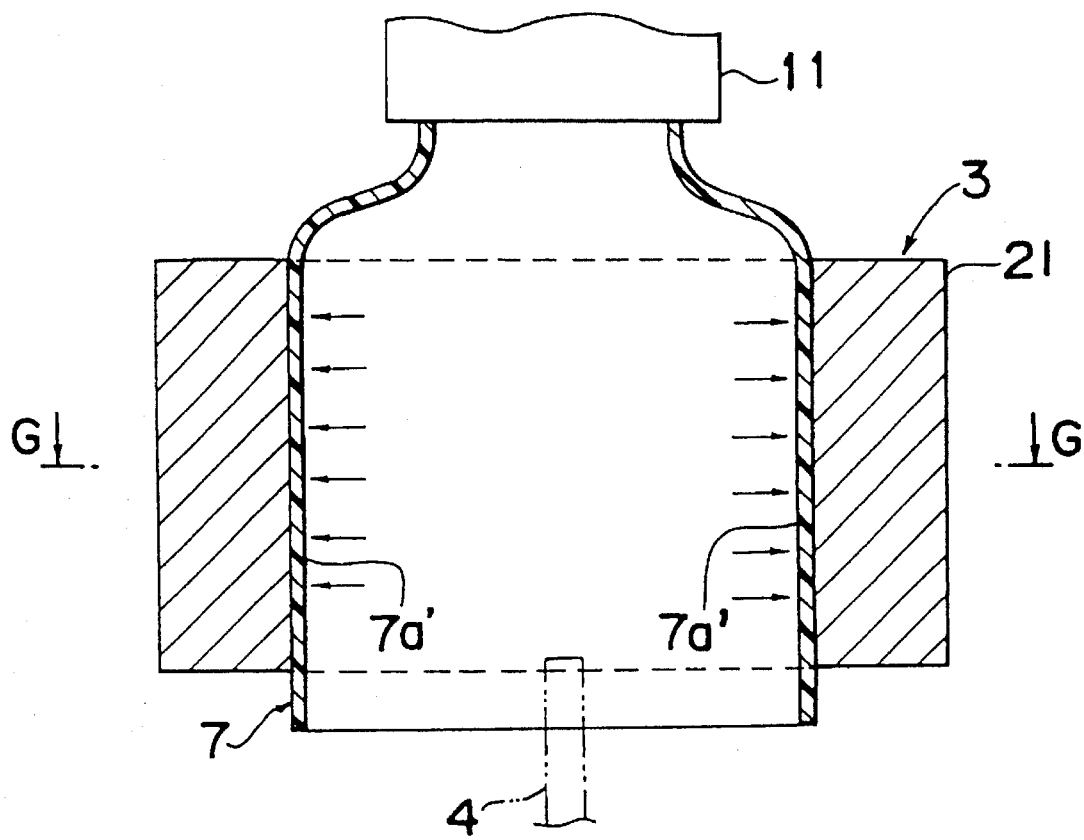
FIG. 15 is an explanatory process drawing showing the state where the parison has been air-blown in the blow-molding method.
Figure 16:
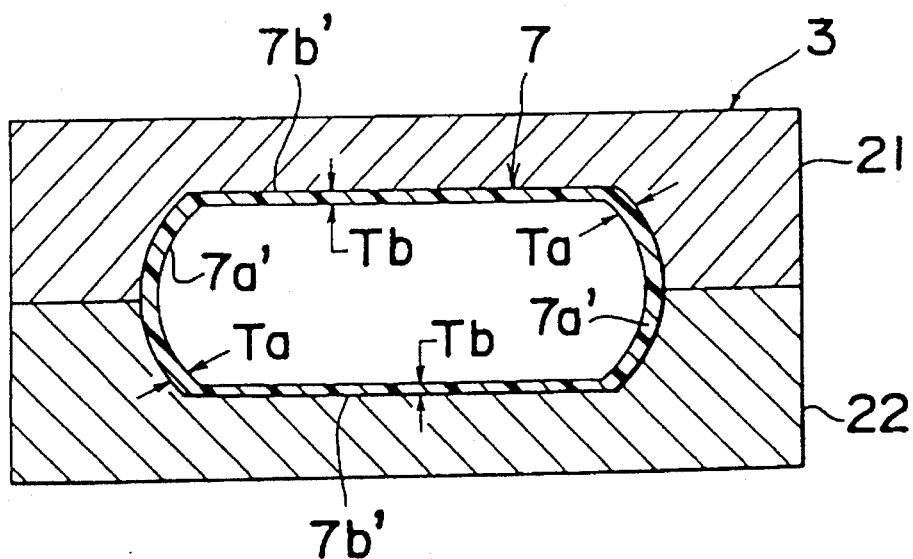
FIG. 16 is an explanatory sectional view along the line G—G in FIG. 15.

And after closing together the molding die 3 (fixed die member 21 and movable die member 22) as shown in FIGS. 15 and 16, the blow-molding is effected by blowing compressed air of a predetermined pressure into the parison by a blowing device 4.

By this blow-molding, the parison 7 in which the specified portions 7a are maintained at a predetermined thickness and other portions 7b, other than the specified portions 7a are thinned in thickness is expanded along the molding surface of the molding die 3 so as to obtain a molded product (seat-back frame 25) having thick portions 7a' of a thickness $T_a$ almost equal to the original thickness $T_o$ of the parison 7 and thin portions 7b' of a thickness reduced to $T_b$.

Thereafter, the parison expanded along the molding surface of the molding die 3 is cooled within the molding die 3 and after lapse of a predetermined time, the molding die 3 is opened to take out the molded product.

It is to be noted that, although the above concrete example relates to the case where the parison is a so-called uniform thickness parison, the blow-molding method of the present invention is not limited to such a case but may be similarly applicable to the case where the parison is a so-called varied thickness parison.

Figure 17:
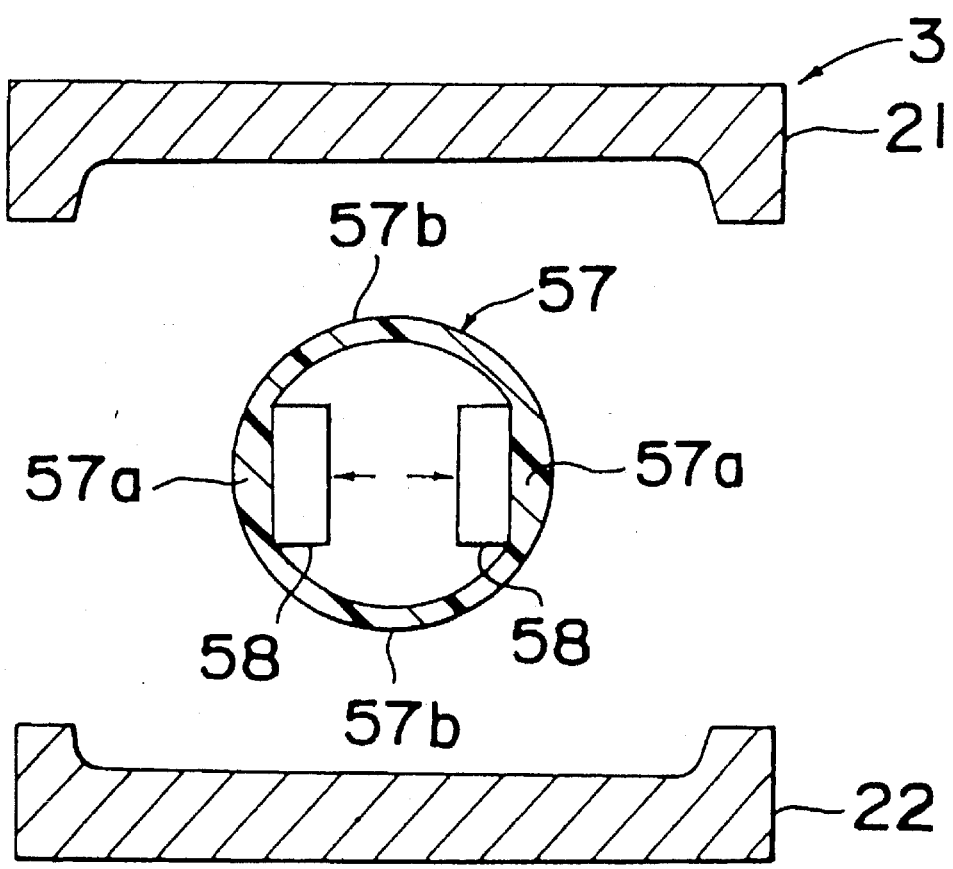
FIG. 17 is an explanatory cross-sectional view of a parison and the expander panels in the case where the parison is a varied thickness parison.

In this case, for example, as shown in FIG. 17, within the molding die 3 (fixed die member 21 and movable die member 22) held in the closed state, a varied thickness parison 57 having thick portions (specified portion) 57a thickened, for example, by core shaving or die saving is caused to hang down and each expander panel 58 is brought into contact with the inner side of thick portion 57a. Therefore, in addition to the expanding of the parison 57, the thickness difference of the parison itself in the hang-down state before the expanding process can be also utilized, whereby a molded product of further larger thickness ratio can be obtained.

However, in the case of hanging down varied thickness parison 57, in order to prevent the occurrence of defects such as surface undulation or deformations of the parison 57, the thickness ratio between thick portions 57a and other portions 57b (portions other than the specified portion) are generally limited to about 1.2 or less.

Furthermore, expander panel 58 for expanding varied thickness parison 57 is of a similar construction to the expander panel for expanding the uniform thickness parison 7 except that the contact surface with the parison 57 is approximately flat.

In the present embodiment, in order that a predetermined thickness ratio can be securely given to the molded product in blow-molding a product made thick at the specified portions by expanding the parison 7 or 57 as described above, the temperature difference between the specified portion 7a, 57a of the parison 7, 57 contacted by the expander panel 8, 58 and other portion 7b, 57b is set in accordance with the set thickness ratio after formation of both portions. Namely, the larger the set thickness ratio is, the larger the temperature difference is set. Furthermore, in the case of using the uniform thickness parison 7, the temperature difference is set larger than when a varied thickness parison 7, is used.

In case of setting the temperature difference, for example, explaining the case of using the uniform thickness parison 7 as an example, the temperature of the specified portion 7a contacted by the expander panel 8 is set at a predetermined temperature by adjusting the surface temperature of the curved surface portion 32 of the temperature conditioning unit 31 through proper control of the temperature and flow rate of the cooling water flowing through the groove portion 33 of the temperature conditioning unit 31 of the expander panel 8. The temperature portion 7b, other than said specified portion 7a, can be set at a predetermined temperature by maintaining the temperature of the molten resinous material supplied to the accumulator head 11 at a predetermined temperature.

Next, an experimental result having examined the relationship between the temperature difference and the thickness ratio is described below.

The experiment was conducted respectively with respect to a uniform thickness parison and a varied thickness parison, and the conditions were as follows.

Figure 18:
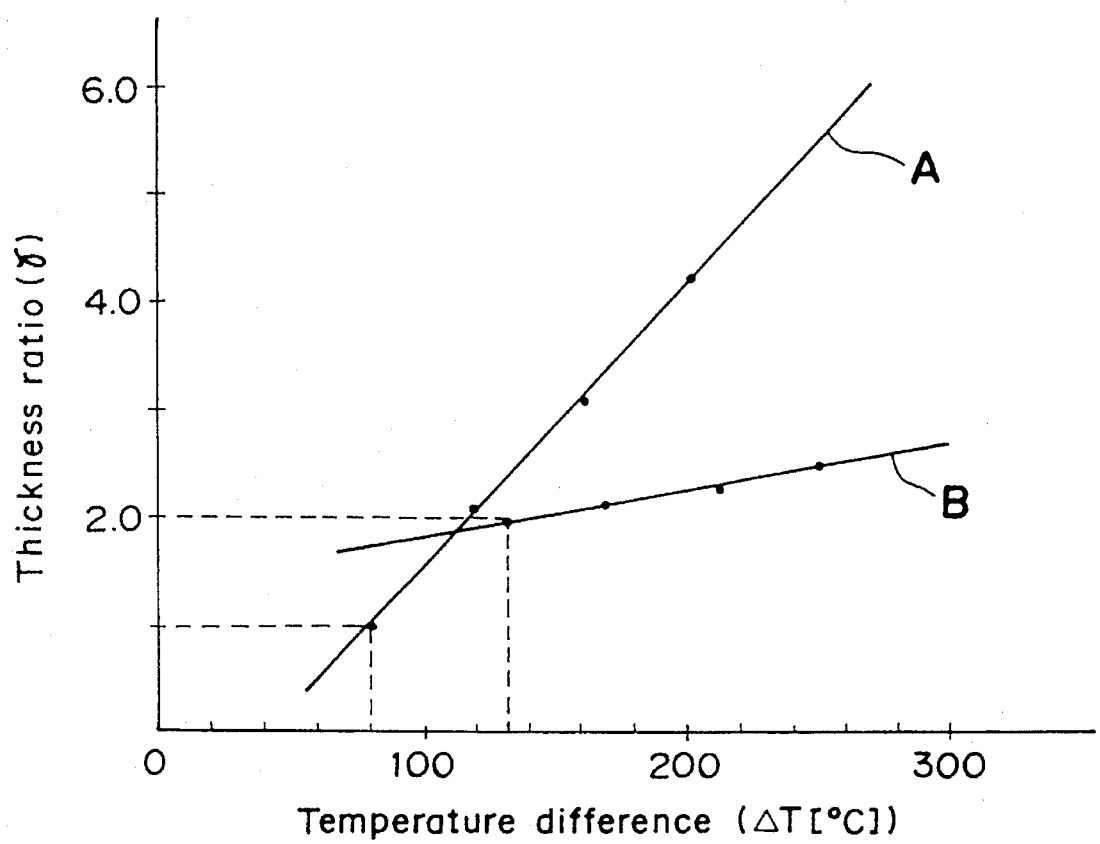
FIG. 18 is a graph showing an example of the relationship between the temperature difference on the part of a parison and the thickness ratio in the case where the parison is an uniform thickness parison.
Figure 19:
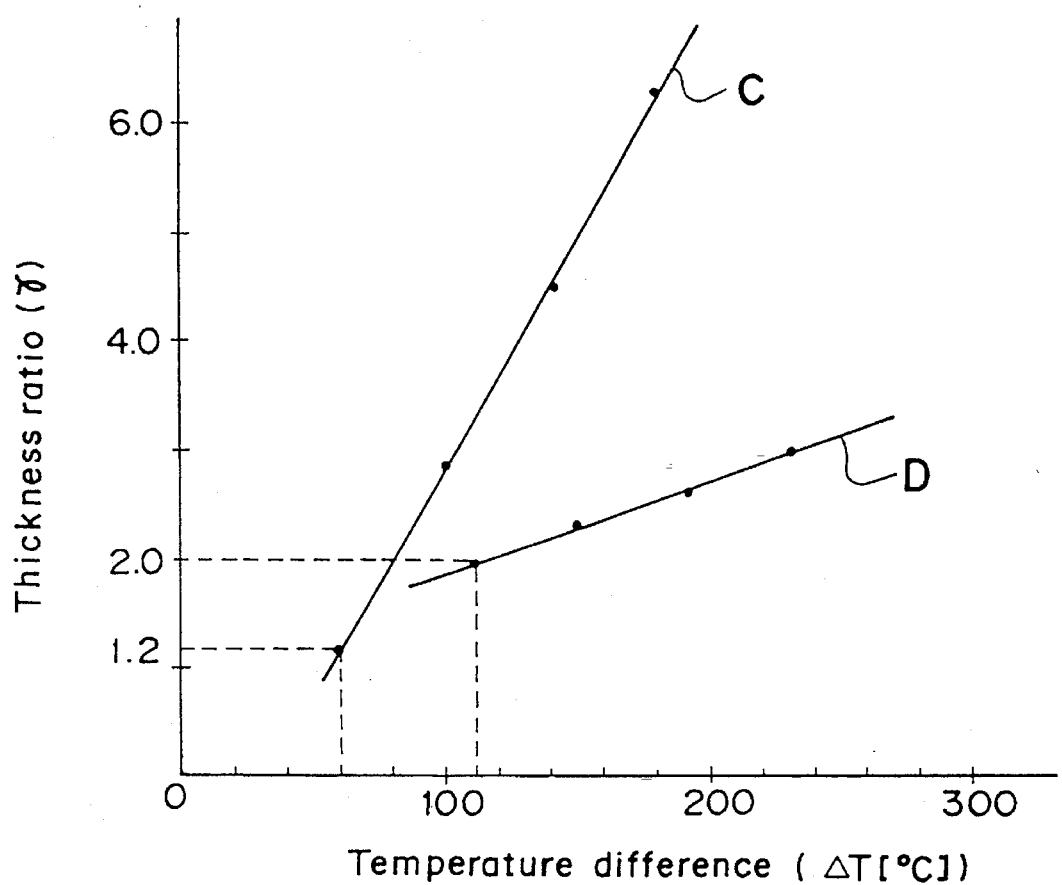
FIG. 19 is a graph showing an example of the relationship between the temperature difference on the part of a parison and the thickness ratio in the case where the parison is a varied thickness parison.

(1) Extension rate: line A of FIG. 18 and line C of FIG. 19 . . . 2.5 times line B of FIG. 18 and line D of FIG. 19 . . . 1.5 times (2) Extension time: 6 seconds (3) Material resin: glass-fiber reinforced polypropylene (4) Material temperature: 240° C.

(5) Molding die temperature: 80° C.

(6) Parison thickness: 6 mm (in the case of varied thickness parison, reference thickness was 6 mm and the core shaving was 1 mm)

Figure 20:
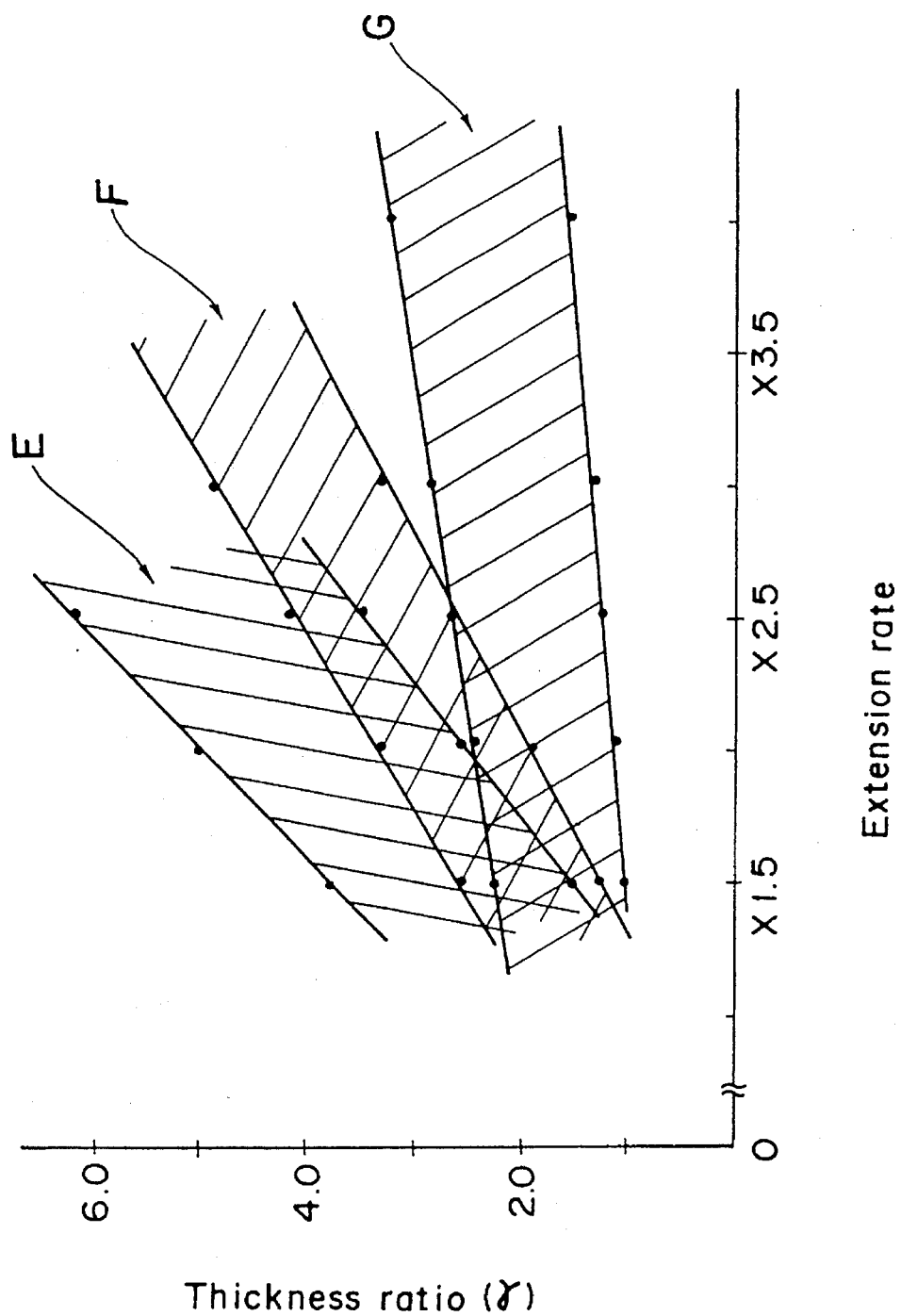
FIG. 20 is a graph showing an example of the relationship between the extension rate of the parison and the thickness ratio thereof.

(7) Diameter of parison at hanging down: line A of FIG. 18 and line C of FIG. 19 . . . 60 mm line B of FIG. 18 and line D of FIG. 19 . . . 170 mm (8) Dimensions of expander panel: line A of FIG. 18, line C of FIG. 19, and FIG. 20 . . . R (radius of curvature) of the curved portion: 30 mm, width: 40 mm, length: 150 mm line B of FIG. 18, line D of FIG. 19, and FIG. 20 . . . R (radius of curvature) of the curved portion: 65 mm, width: about 130 mm, length of reference curved portion: 400 mm Furthermore, the extension rate shows the rate in which the parison is extended relative to its original diameter. The relationship between the extension rate and the thickness ratio tends to differ with the type of the parison (uniform thickness type or varied thickness type), the kind of material resin (for example, whether or not reinforcing fiber is filled in), and the like.

In this connection, FIG. 20 is a graph showing the relationship between the extension rate and the thickness ratio in the case where the temperature difference between the parison portion contacted by the expander panel and other portion is maintained at 180° to 200° C. In the graph, respective hatched areas E, F and G show the data under the following conditions.

Area E: In the case of a varied thickness parison wherein the material is glass-fiber reinforced polypropylene.

Area F: In the case of an uniform thickness parison wherein the material is glass-fiber reinforced polypropylene.

Area G: In the case of an uniform thickness parison wherein the material is common polypropylene.

As is evident from the graph in FIG. 20, when resinous material filled with reinforcing fiber is employed for such as the case of molding construction members requiring strength and rigidity, the extension rate can be made smaller with respect to the same thickness ratio $\gamma$. Furthermore, in the case of employing a varied thickness parison, the extension rate can be made smaller as compared with the case of employing an uniform thickness parison.

Next, the experimental results of measuring the change in the thickness ratio $\gamma$ according to the change in the temperature difference $\Delta T$ between the specified portion of the parison contacted by the expander panel and the other portion under the conditions (1) to (8) is shown respectively in line A and line C in the graphs of FIGS. 18 and 19. Here, line A in FIG. 18 and line C in FIG. 19 respectively show the maximum values for the cases of an uniform thickness parison and a varied thickness parison.

Furthermore, the relationship between the temperature difference $\Delta T$ and the thickness ratio $\gamma$ in the case of molding the seat-back frame 25 according to the concrete example is shown respectively in line B and line D in the graphs of FIGS. 18 and 19. Here, line B in FIG. 18 and line D in FIG. 19 are respectively for the cases of an uniform thickness parison and a varied thickness parison.

Furthermore, in the respective experiments, the temperature difference $\Delta T$ between the specified portion of the parison and the other portion was obtained by measuring the parison temperature immediately after extrusion from the accumulator head 11 as the temperature of the portion other than the specified portion, and the surface temperature of the contact surface of the expander panel as the temperature of the specified portion, thus to calculate the difference of both measurement values.

From these experimental results, in the case of a construction member such as a seat-back frame which requires some extent of strength and rigidity, since a thickness ratio $\gamma$ of more than 2.0 is generally required for the molded product, it is known that the temperature difference $\Delta T$ on the parison may be set at more than about 130° C. in the case where the parison is an uniform thickness parison 7 (refer to line B in FIG. 18). Meanwhile, in the case of a varied thickness parison 57, the temperature difference $\Delta T$ may be set at more than about 110° C. (refer to line D in FIG. 19).

On the other hand, in the case of the general molded product which does not require special high strength, the thickness ratio $\gamma$ between the specified portion contacted by the expander panel and the other portion may be set at least at more than 1.0 for the uniform thickness parison 7, namely, it may be set so that the thickness at the specified portion may not become thinner than the other portion due to some scattering in thickness in the circumferential direction.

In the case of a varied thickness parison 57, since the thickness ratio between the thick portion and thin portion is generally limited to less than about 1.2 as described earlier, the thickness ratio $\gamma$ may be secured at more than 1.2.

Therefore, when the relationship between the thickness ratio $\gamma$ and the temperature difference $\Delta T$ conforms to line A in FIG. 18 (in case of an uniform thickness parison) or line C in FIG. 19 (in case of a varied thickness parison), the temperature difference $\Delta T$ may be set at more than about 80° C. in the case of an uniform thickness parison 7 or at more than about 60° C. in the case of a varied thickness parison 57.

As described above, according to the present embodiment, in blow-molding a molded product (seat-back frame) wherein the specified portion is thickened through extending the parison in a certain direction, since the temperature difference $\Delta T$ between the specified portion 7a, 57a of the parison and the portion 7b, 57b other than the specified portion at the extending time is set according to the set thickness ratio after forming both portions, the larger the set thickness ratio $\gamma$ is, the more the cooling and solidification at the specified portion 7a, 57a is facilitated as compared at the other portion 7b, 57b. When the said other portion 7b, 57b is extended so as to become thin in thickness, the fluid motion of material resin at the specified portion 7a, 57a is strongly restricted to maintain the thickness at this portion in a state close to a original thickness.

In other words, by setting the temperature difference $\Delta T$ in accordance with the set thickness ratio $\gamma$, the larger the set thickness ratio is, the larger the thickness difference between the specified portion 7a, 57a and the other portion 7b, 57b of the parison 7, 57 can be made. Even in the case of molding such molded product as a structural member requiring a large thickness ratio, the desired thickness ratio $\gamma$ can be given easily and securely.

Furthermore, particularly in the case where the parison is a so-called varied thickness parison 57, since expander panels 8 are brought into contact with the thick portions 57a and the thickness difference of the varied thickness parison 57 itself in the hanging-down state can be also utilized, it becomes possible to give a further larger thickness ratio $\gamma$ to the molded product.

It is to be noted here that the method of using the varied thickness parison is effectively applicable not only to the first embodiment but also to respective embodiments to be described later. By extending the parison with the expander member being in contact with the thick portion, the same effect as the above can be exhibited.

Furthermore, in the case of employing the so-called uniform thickness parison 7, since the temperature difference ΔT at the extending time is set larger than with a varied thickness parison, by using the uniform thickness parison 7, the occurrence of such a defect as the surface undulation or other deformations of the parison can be eliminated and the same thickness ratio γ as in the case of the varied thickness parison 57 can be given to the molded product.

[Embodiment 2]

Next, a second embodiment of the present invention will be described below.

The molding method according to the second embodiment is arranged to securely impart a predetermined thickness ratio to the molded product and to secure the moldability of the thick portion and separability of the expanding member in blow-molding the molded product wherein a specified portion thereof is thickened by extending a parison, and is executed by using a molding apparatus similar to that in the first embodiment. Furthermore, the forming process is similar except for a part thereof. Therefore, in the following description, same parts as in the first embodiment are omitted as much as possible to avoid duplication.

In the first place, in the same manner as in the first embodiment, expander panels 8 are set to be positioned in the inner side of the specified positions of the parison (refer to FIGS. 9, 10). In this initial process, the open-closed state of change-over valves Vh, Vc is set so that a cooling pump Pc is connected to flow passage 40, and cooling water is introduced into the groove portion 33 of temperature conditioning unit 31. By adjusting the surface temperature of the curved surface portion 32 of the temperature conditioning unit 31 through proper control of the temperature and flow rate of this cooling water, the temperature of specified portion 7a of the parison can be set at a predetermined value. In the present embodiment, the surface temperature of the curved surface portion 32 of the temperature conditioning unit 31 is set, for example, at 1° to 2° C.

As parison 7, any type of the so-called uniform thickness parison or varied thickness parison may be employed. But in the present embodiment, description will be made taking the case where the parison is an uniform thickness parison as an example, as in the case of the first embodiment.

Next, by driving the expander panels 8, the curved surface portion 32 of the temperature conditioning unit 31 of each expander panel 8 is brought into contact with each specified position 7a of the parison 7 (refer to FIGS. 11, 12). By this action, each of the specified portions of the parison 7 is immediately cooled and solidified starting from the inner peripheral surface portion 7f contacted by the expander panel 8 (refer to FIG. 7).

Figure 13:
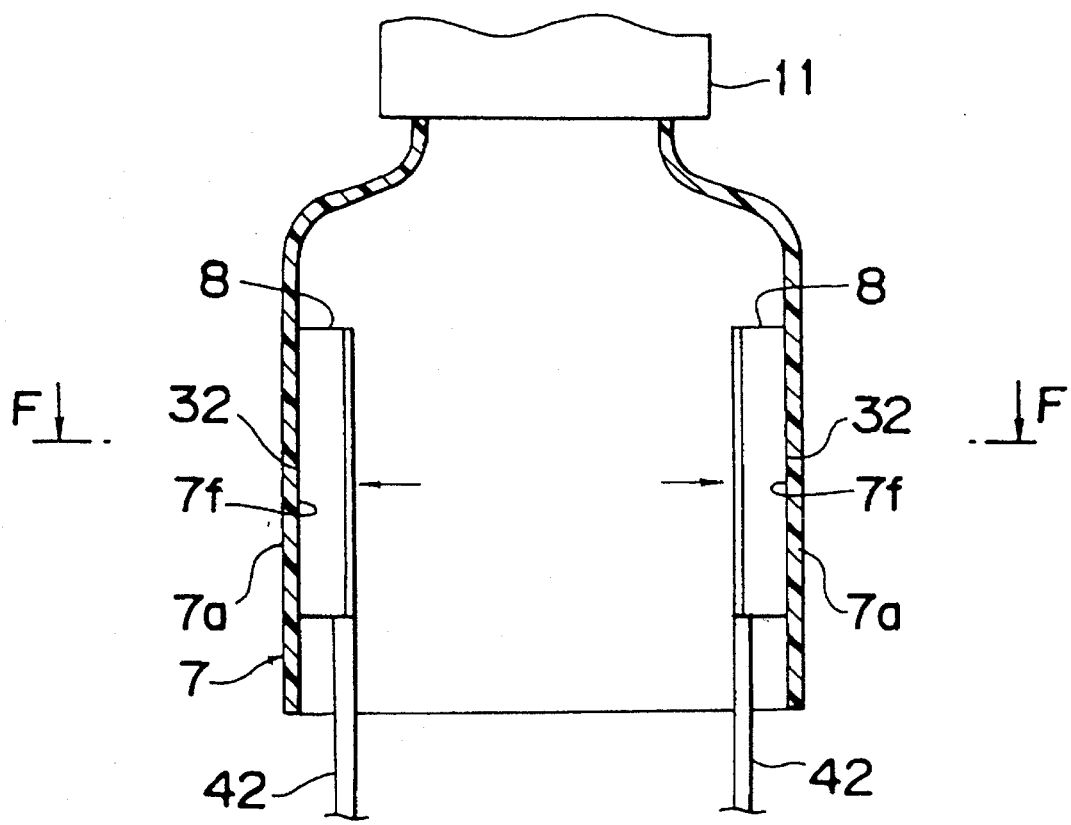
FIG. 13 is an explanatory process drawing showing the state where the parison has been expanded in the blow-molding method.
Figure 14:
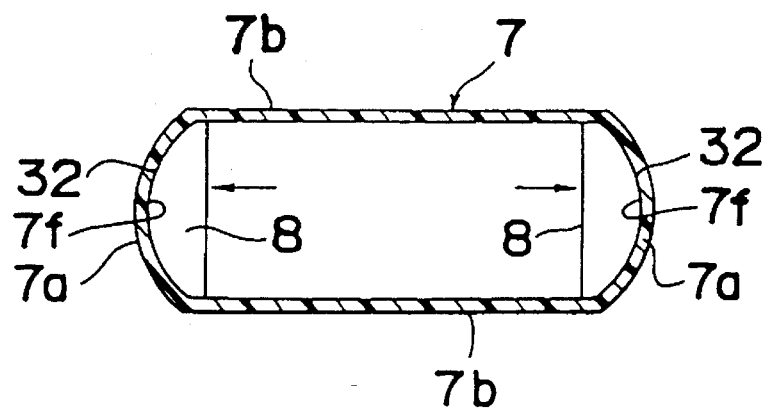
FIG. 14 is an explanatory sectional view along the line F—F in FIG. 13.

Next, the expander panels 8 are driven further outward so as to extend portions 7b other than the specified portions 7a of the parison, reducing the thickness thereof (refer to FIGS. 13, 14).

At this time, since each specified portion 7a of the parison is in the sufficiently solidified state and portions 7b other than the specified portions 7a are cooled and solidified during the extension process, specified portion 7a is suppressed in the fluidity of material resin, and kept at a thickness almost equal to the original thickness $T_o$. the process up to this point is the same as in the first embodiment.

In the present embodiment, the movement amount of each of the expander panel 8 is restricted so that the specified portions 7a of the parison do not contact the molding surface of the molding die 3 (metallic molds 21, 22). When this movement is stopped to end the extension process, the circulation water flowing through the flow passage 40 is switched to hot water. By supplying hot water to the groove portion 33 within the temperature conditioning unit 31 of each expander panel 8, the contact portion 7f of specified portion 7a is heated until the surface temperature of specified portion 7a contacting each curved surface portion 32 reaches a predetermined temperature.

In other words, when the extension process is completed, each drain valve 39 is opened to discharge cooling water from the flow passage 40 including the groove portion 33. On completion of the discharge, drain valves 39 are closed and at the same time, the open-closed state of respective change-over valves Vh, Vc is switched over so that the hot water pump Ph is connected to flow passage 40. By the hot water pump Ph, hot water of a predetermined temperature is circulated through flow passage 40 and by the heat exchanged with this hot water, the contact portion 7f of the specified portion 7a of the parison 7 is heated.

As the temperature of the contact portion 7f of specified portion 7a, it is desirable to set it at the temperature of contact portion 7f at the starting time of the extension process in order to secure good moldability of the specified portion 7a in the blow-molding process by blowing to be conducted after the extension process.

In the present embodiment, heating is provided until the temperature of the contact portion 7f of specified portion 7a, namely, the surface temperature of the curved surface portion 32 of the temperature conditioning unit 31 reaches, for example, 60° to 120° C.

Thereafter, the expander member driving device 5 is activated to separate the expander panels 8 from the specified portions 7a of the parison 7 and take them outside the parison 7.

At this time, since the curved surface portion 32 of the expander panel 8 and the contact portion 7f of the specified portion of the parison is heated up to temperature, both members do not stick to each other and the expander panel 8 can be separated from the parison 7 without any trouble.

After the molding die 3 (fixed mold 21 and movable mold 22), is closed together compressed air of a predetermined pressure is blown into the parison 7 by the blowing device 4 to effect blow-molding (refer to FIGS. 15 and 16.)

At this time, since the contact portion 7f of the specified portion 7a of parison 7 has been warmed up to temperature, the moldability of specified portion 7a is secured at a good level during the molding process, and occurrence of defective molded products due to deterioration of its moldability is prevented effectively.

As explained so far, according to the present embodiment, since the portions 7b other than the specified portions 7a are extended by moving the expander panels 8 to intermediate positions before contact of the specified portions 7a of the parison 7 with the molding surface of the metallic molds 21, 22, and then, the contact portions 7f of the specified portions 7a contacted by the expander panels 8 are heated up to a predetermined temperature before closing the metallic molds 21, 22 for effecting blow-molding, specified portions 7a of the parison 7 are not subjected to blow-molding in the excessively cooled and solidified state, and the moldability at specified portions 7a can be secured at a good level.

Furthermore, in taking respective expander panels 8 out of the parison 7, the separability of expander panel 8 from the contact portion 7f of the specified portion 7a of the parison can be secured at a good level.

In this case, until the extension process of the portions 7b other than the specified portions of the parison is completed, specified portion 7a is facilitated to be cooled and solidified by the expander panel 8. Therefore, when the portions 7b other than the specified portions are extended and thinned in thickness, the flow of material resin at the specified portions 7a is restricted and the thicknesses at these portions are maintained at a thickness closer to the original thickness.

Namely, the predetermined thickness ratio can be securely imparted to the molded product, the moldability of the thick portion can be secured at a good level with occurrence of defective molding products being prevented and the separability of the expander panels 8 can be well secured to positively prevent the adhesion of specified portions 7a to the contact portions 7f.

In addition, particularly because the hot water pump Ph and the cooling water pump Pc are switchably connected to a series of flow passages 40 including the groove portion 33 within the temperature conditioning unit 31 of the expander panel 8, cooling water is circulated through flow passages 40 until completion of the extension process of the portions 7b other than the specified portions of the parison 7, and the connection state of the pumps Ph and Pc is switched over to circulation of hot water on completion of the extension process, the structure and operation of the molding apparatus can be simplified as compared with the case of providing a heating means and a cooling means individually from the expander panel for heating and cooling the specified portions of the panel and driving them separately.

Furthermore, in the present embodiment, since parison 7 a so-called uniform thickness parison, the possibility of occurrence of surface undulation or deformation of the parison during hanging down thereof can be eliminated.

It is to be noted here that, although each of the first and second embodiment refers to the blow-molding of seat-back frames for automobile seats, the present invention is not limited to the above case may be applicable to the case of manufacturing various blow-molding products in which a specified portion thereof is of a thick thickness.

Furthermore, although each expander member 8 is arranged in the inner side of the parison 7 in each of the first and second embodiments, it is also possible that the expander member is arranged outside the parison, for example, by adopting such an expander member having attraction function.

[Embodiment 3]

Next, a third embodiment of the present invention will be described.

The molding apparatus according to the third embodiment is a blow-molding apparatus for obtaining a molding product of a predetermined shape by blow-molding after extending a parison in a flat shape which is capable of forming both end portions in flat direction thicker than the thickness in the central portion and adjusting to increase or decrease the range of thick thickness formation.

Figure 21:
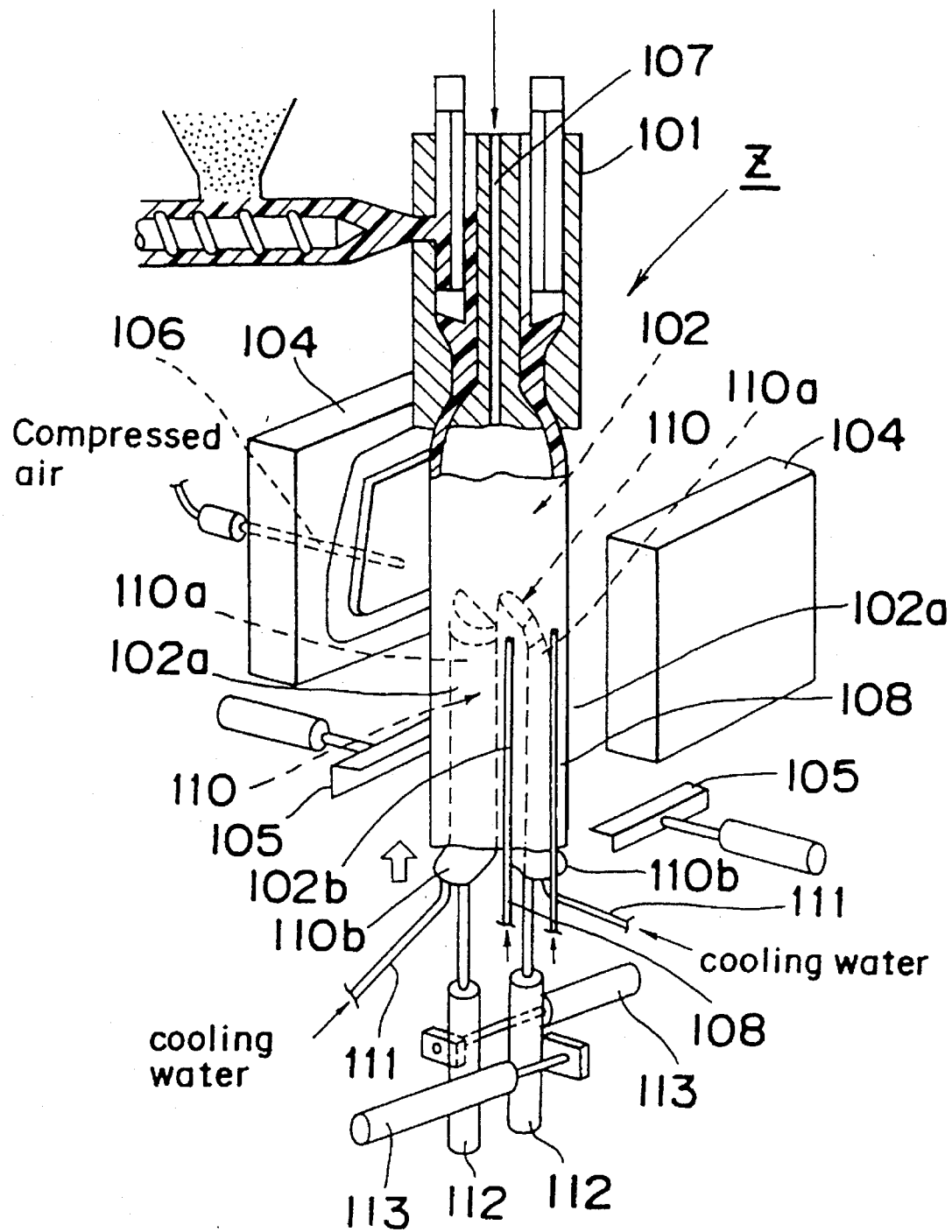
FIG. 21 is a perspective view of a blow-molding apparatus according to a third embodiment of the present invention.
Figure 25:
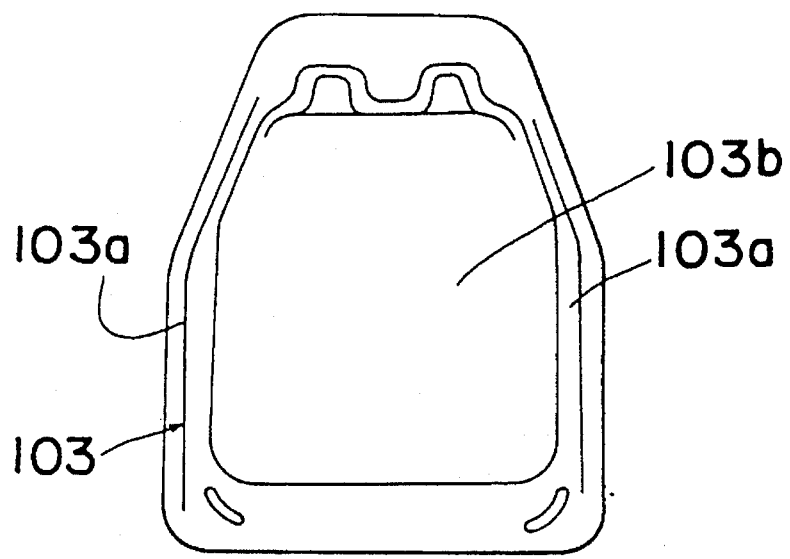
FIG. 25 is a front view of a resinous molding product molded by a blow-molding apparatus of the present invention.
Figure 27:
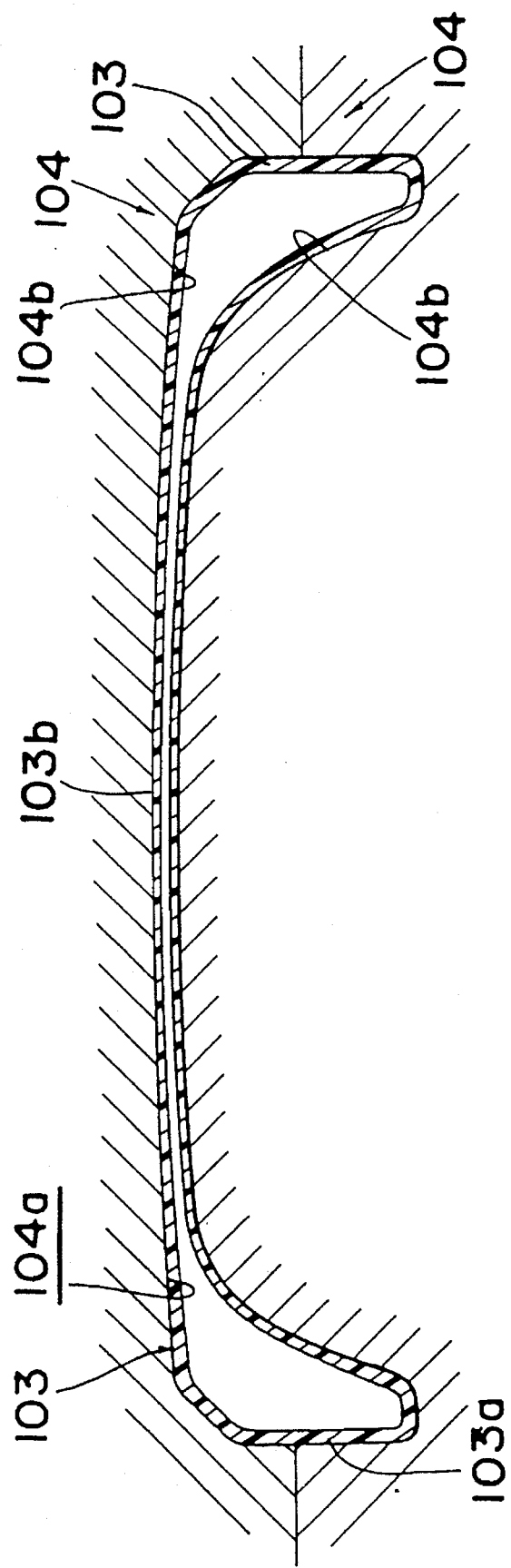
FIG. 27 is an explanatory drawing of the molding state in FIG. 23.

FIG. 21 shows a blow-molding apparatus Z according to the third embodiment of the present invention. The blow-molding apparatus Z is intended to form integrally by blow-molding a seat frame 103 for automobile seats having a concave flat section in which, as shown in FIGS. 25 and 27, the central portion in the width direction is made a back supporting portion 103b composed of two confronting plate members having a narrow gap and both end portions in the width direction are made end expanded portions 103a projected toward the front side in a bank shape. The apparatus Z is provided, as will be described later, with an extruder 101, a pair of molding dies 104, a pair of pre-pinching panels 105, a pair of expanding panels 110, cooling water tubes 111 as a first cooling means and cooling air tubes 108 as a second cooling means.

Extruder 101 is intended to sequentially extrude resinous material in a tubular shape under the semi-molten state to form a parison 102. In the axial portion, there is formed an air passage 107 for supplying blowing air into parison 102. Furthermore, the parison 102 extruded from this extruder 101 is of a high temperature of 220° to 225° C.

Molding dies 104 are arranged movably to approach or part from each other below extruder 101 with the axial line of the extruder being held therebetween. In blow-molding, both dies are caused to butt to each other to form a forming space of a predetermined shape therein (refer to FIG. 27). In addition, these molding dies 104 are kept at all times at a temperature of 60° to 65° C. by a proper heating means. Furthermore, in one of the pair of molding dies 104 is provided a blow nozzle 106 for supplying blow-molding compressed air in the state where its tip end is projected into the molding Space, through piercing through the molding die from the outside.

Figure 23:
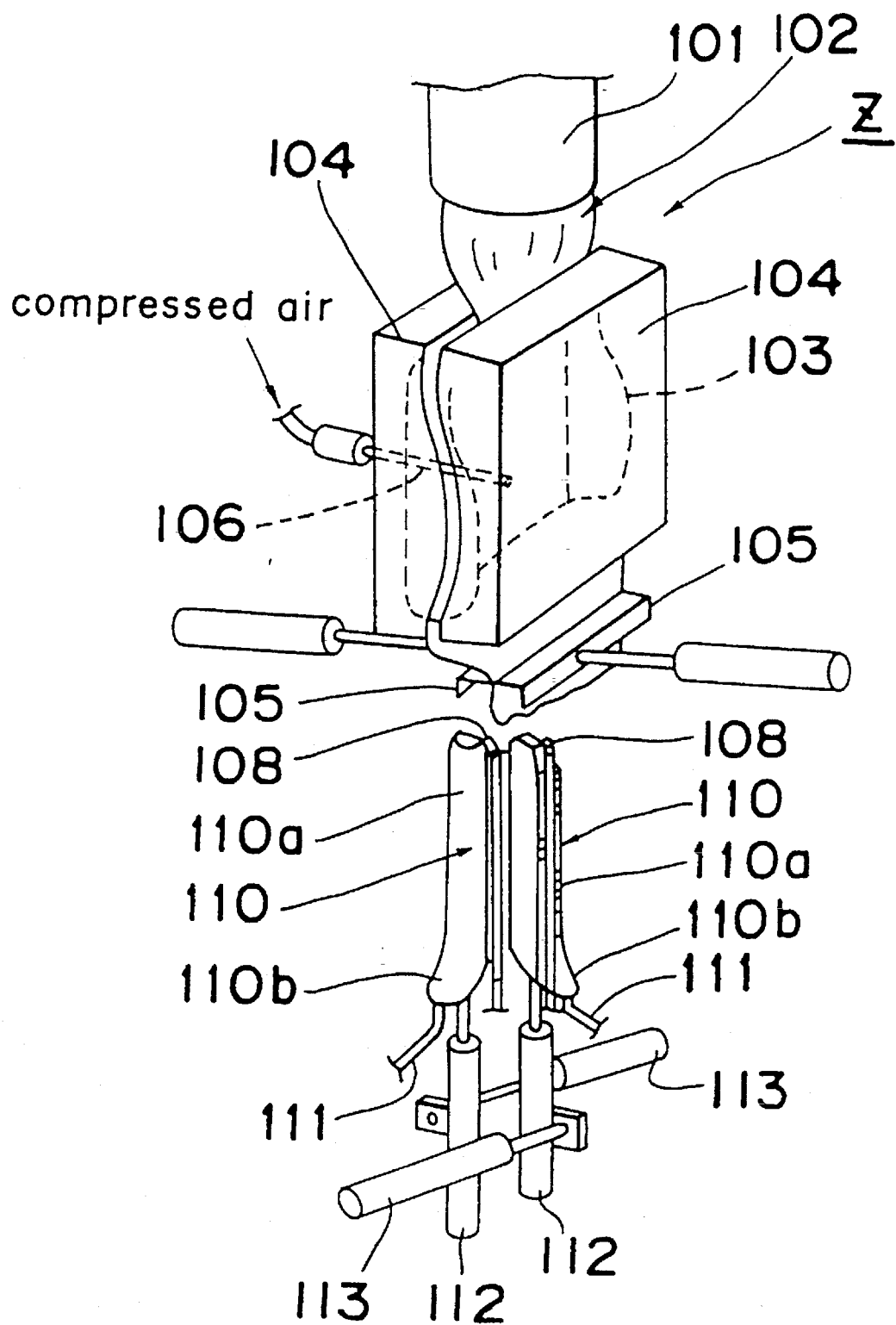
FIG. 23 is a perspective view showing a state change in FIG. 21.

Pinching panels 105 are composed by confronting plate members arranged below molding dies 104 with parison 102 held in the axial direction therebetween and movably to approach or part from each other. They are arranged to tighten, in the approach state, the lower end portion of parison 102, correctly, the lower end portion of the extended parison 120 to be described later from both sides as shown in FIG. 23 to seal it.

Figure 26:
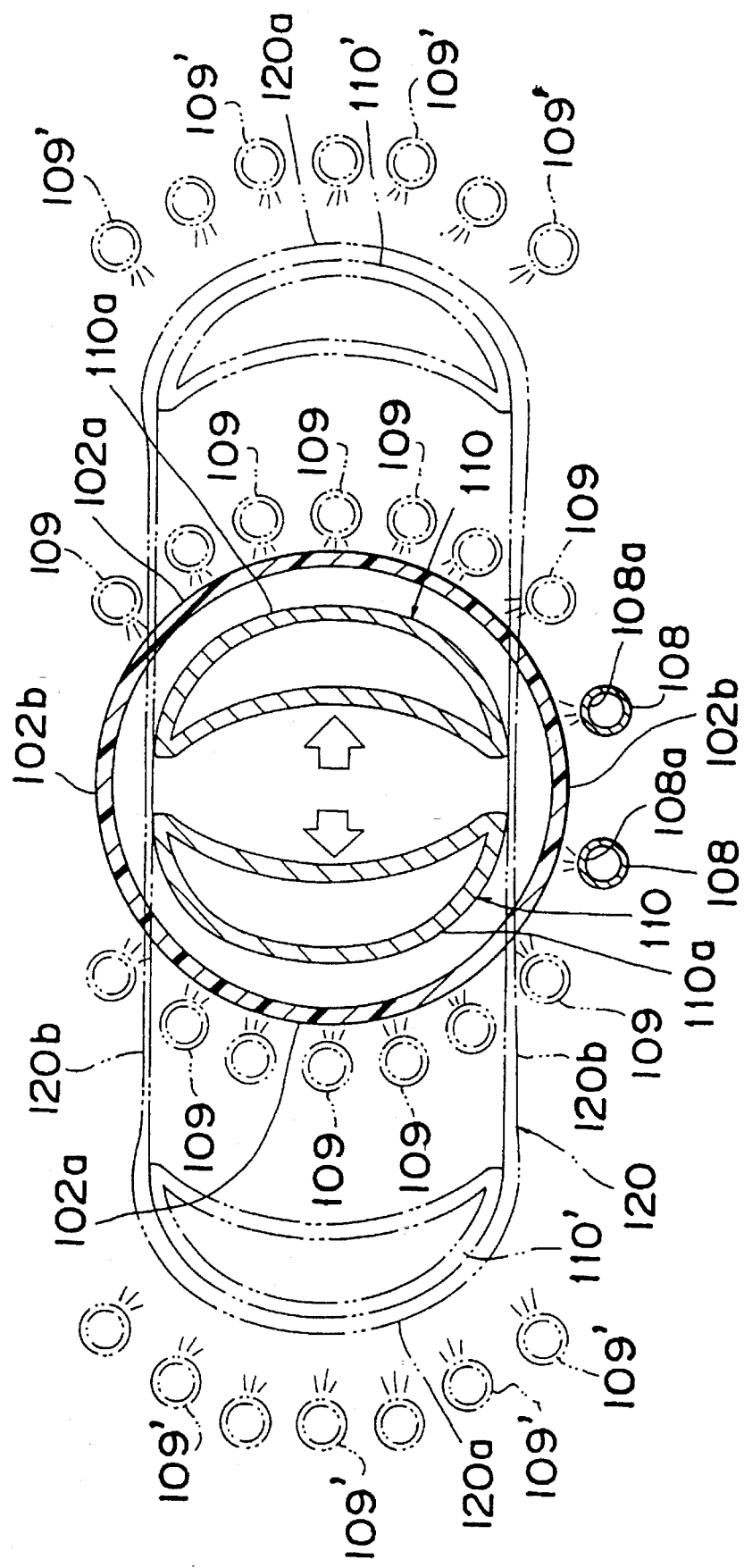
FIG. 26 is an explanatory drawing showing the molding states in FIGS. 21 and 22 with part of a blow-molding apparatus according to a modified version of the third embodiment of the present invention being added thereto.

Each of the expanding panels 110 is integrally formed in a sealed tubular member of a predetermined length (concretely, longer than the dimension in the up-and-down direction of the seat frame 103 as a product) having a crescent-shaped cross section as shown in FIGS. 21 and 26. Expanding panel 110 is formed so that the outer peripheral surface of its expanding side is made the contact surface 110a having a curved surface almost in agreement with the inner peripheral shape of the parison 102. The lower end portion is bent toward contact surface 110a as its skirt portion 110b. Furthermore, within the expanding panel 110, cooling water is supplied through a cooling water tube 111, and by this cooling water, the contact surface 110a is forcibly cooled to maintain its temperature at 3° to 6° C.

The expanding panels 110 constructed as described above are arranged to confront each other with respective contact surfaces 110a being directed outward, and to be lifted or lowered in the direction parallel to the axial direction of extruder 101 by lifting cylinders 112, and to be movable in the approaching or parting direction by slide cylinders 113 provided on lifting cylinders 112.

Furthermore, expanding panels 110 are set in their arrangement positions in the vertical and horizontal directions relative to the parison 102 so that, in the lifted state, they are entered into the interior of the parison 102 by a predetermined amount as shown in FIG. 21. In the lowered state, they are positioned below the lower end portion of said parison 102 as shown in FIG. 23. In the approached state, they are held in non-contact with the inner peripheral surface of the parison 102 within the parison as shown by the full line in FIG. 26. In the parted state, they are positioned greatly outward of the cylindrical parison 102 in the radial direction as indicated by the chain line in FIG. 26.

Furthermore, as shown in FIGS. 21 to 23 and 26, on one side perpendicular to the approach or part direction of expanding panels 110 in the approached state, two cooling air tubes 108 having a large number of air outlet ports $108_a$, are arranged parallel to respective expanding panels 110 in the vertical direction. These cooling air tubes 108 so as are fixedly arranged so as to maintain at all times a predetermined relationship with respect to the axial line of the extruder 101, with respective air discharge ports $108_a$, being directed toward the expanding panels 110. The blowing time and blowing amount (namely, cooling capacity) of cooling air from respective cooling air tubes are adjustable arbitrarily.

Subsequently, the operation sequence and operation effect in the case of forming a seat frame 103 by using the blow-molding apparatus Z will be described below.

(a) Extrusion of parison 102:

In the first place, in the state where, as shown in FIG. 21, the molding dies 104 are opened, pre-pinching panels 105 are parted from each other, and expanding panels 110 are set at the lowered positions. Extruder 101 is activated to extrude from its lower end a parison 102 of a predetermined diameter (for example, diameter of 170 mm) and a predetermined thickness (for example, 8 to 9 mm) by a proper length in the hang-down state. When extrusion of the parison 102 is completed, the expanding panels 110 are lifted in the approached state to proceed to the predetermined positions within parison 102 (refer to the full-line indicated state in FIG. 26).

It is to be noted here that although the expanding panels 110 are inserted into the parison 102 from below after extruding the parison in the hang-down state in the present embodiment, the expanding panels 110 may be first lifted to extrude the parison 102 thereafter over the outside of the expanding panels 110.

Figure 22:
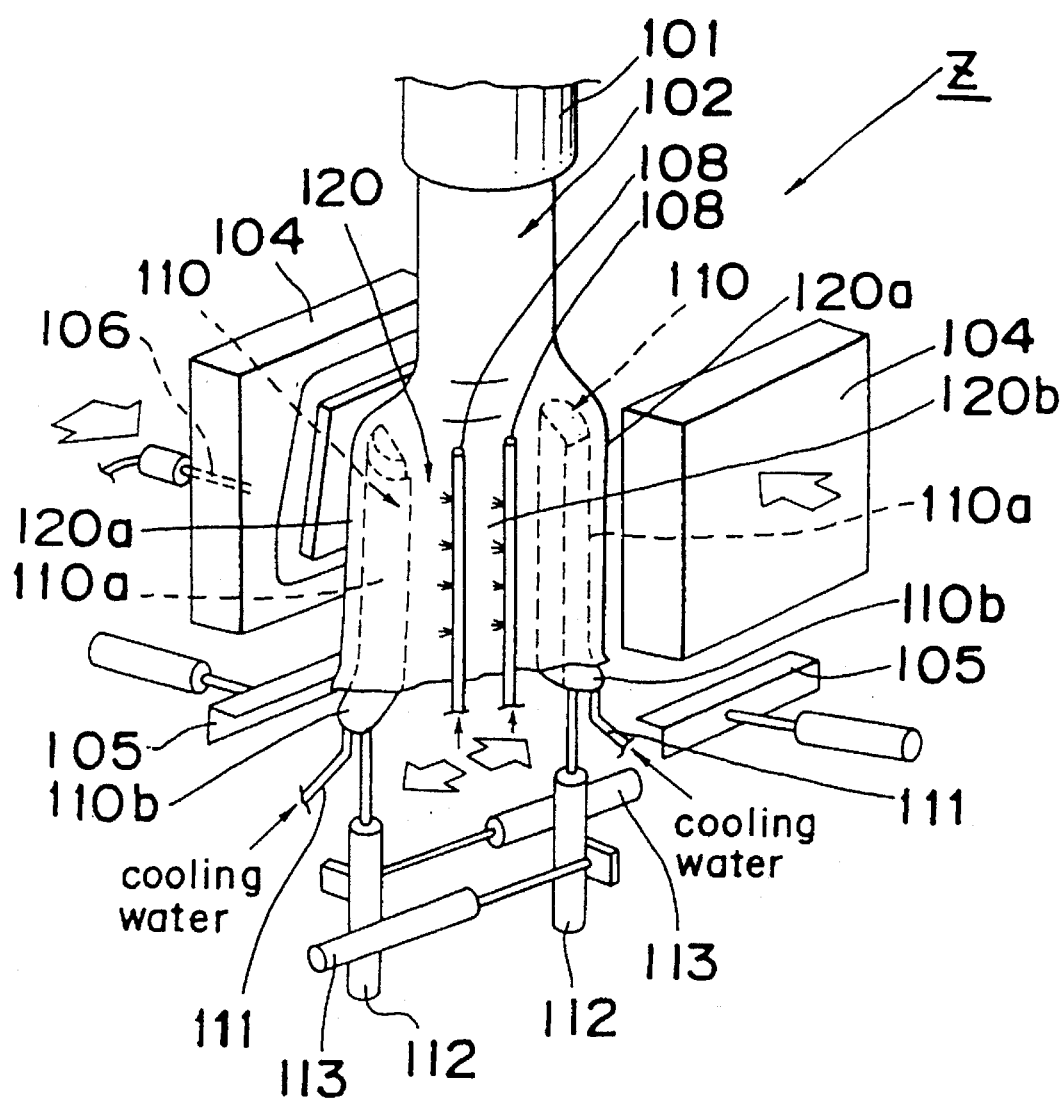
FIG. 22 is a perspective view showing a state change in FIG. 21.

(b) Extension of the parison 102:

As shown in FIG. 22, by parting respective expanding panels 110, from each other by sliding cylinders 113, parison 102 is extended by a predetermined dimension in the lateral direction (for example, in the case of the parison being of 170 mm diameter, the distance between the outer peripheral surfaces in the extension direction is set at about 400 mm).

In this case, accompanying the parting motion of expanding panels 110, the portion $102_a$ of the parison 102 corresponding to the contact surface $110_a$ of expanding panel 110 is in contact entirely with the contact surface $110_a$ from the initial stage of the parting motion of the expanding panels 110 and is positively cooled to be early solidified and lowered in fluidity, since the contact surface $110_a$ is cooled by cooling water supplied from the cooling water tube 111 and is formed in a shape almost in agreement with the shape of the inner peripheral surface of parison 102. Therefore, despite the extending action of expanding panels 110, the portions $102_a$ corresponding to contact surfaces $110_a$ are not extended as much and are held in an almost uniformly thick thickness state.

On the contrary, although one intermediate portion $102_b$ not contacting expanding panels 110 is not cooled by the contact surfaces $110_a$, it is cooled by cooling air ejected from the fixedly arranged cooling air tubes 108 while being gradually extended. Therefore, between the portion cooled by cooling air in the initial stage of the extension process and reduced in fluidity, that is, the portion close to the portions corresponding to expanding panels 110 and the central portion which is sequentially cooled by cooling air to be lowered in fluidity after being extended to some extent under a high fluidity before cooling, the thickness of the parison is gradually changed as indicated by the chain line in FIG. 26.

As the result, the extended parison 120 formed in this extension process has, as indicated by the chain line in FIG. 26, the largest thickness (4.5 to 5.5 mm) at both end portions $120_a$ and is maintained at almost constant thickness there, while on the intermediate portion $120_b$ on the side where cooling air tubes 108 are installed, the thickness gradually decreases from both end portions $120_a$ toward the central portion (for example, from 4.5 to 5.5 mm down to 2.0 to 2.2 mm). Meanwhile, the central portion $120_b$ on the side where cooling air tubes are not installed are maintained at a high fluidity through the entire period of the extension process and thus is extended almost uniformly so as to be formed in a thin thickness state (for example, 2.0 to 2.2 mm).

Further in this case, by adjusting to increase or decrease the ejecting time for cooling air from cooling air tubes 108, the length of the varied thickness portion can be easily adjusted. By adjusting the flow rate of cooling air, the gradual thickness decrease state can be easily adjusted.

After forming the extended parison 120 by parting the expanding panels 110 to the specified positions, the expanding panels 110 are caused to exit from extended parison 120 by lowering the expanding panels 110 as they are. In this case, since the skirt portion $110_b$ is formed in the lower end portion of each expanding panel 110 in the present embodiment, the lower end portion of the extended parison 120 is formed to be extended outward by skirt portion $110_b$ in the state where the extended parison 120 is formed by the expanding panels 110 as shown in FIG. 22. Therefore, in taking out expanding panel 110 from the extended parison 120, exiting of the expanding panel 110 can be easily effected without sticking of the lower end portion of the extended parison 120 to the contact surface $110_a$ of the expanding panel 110 and thus without destroying the shape of the extended parison 120.

(c) Blow-molding

Since the extended parison 120 wherein expanding panels 110 are removed is hung down as it is extended in the width direction, it becomes difficult to maintain the shape as it is. Therefore, after removing expanding panels 110, as shown in FIG. 23, the lower end portion of the extended panel 120 is put together and sealed by the pre-pinching panels 105. Low pressure air is properly fed from air passage 107 to expand the extended parison 120 somewhat larger than the shape at the molding time by the air pressure.

Figure 24:
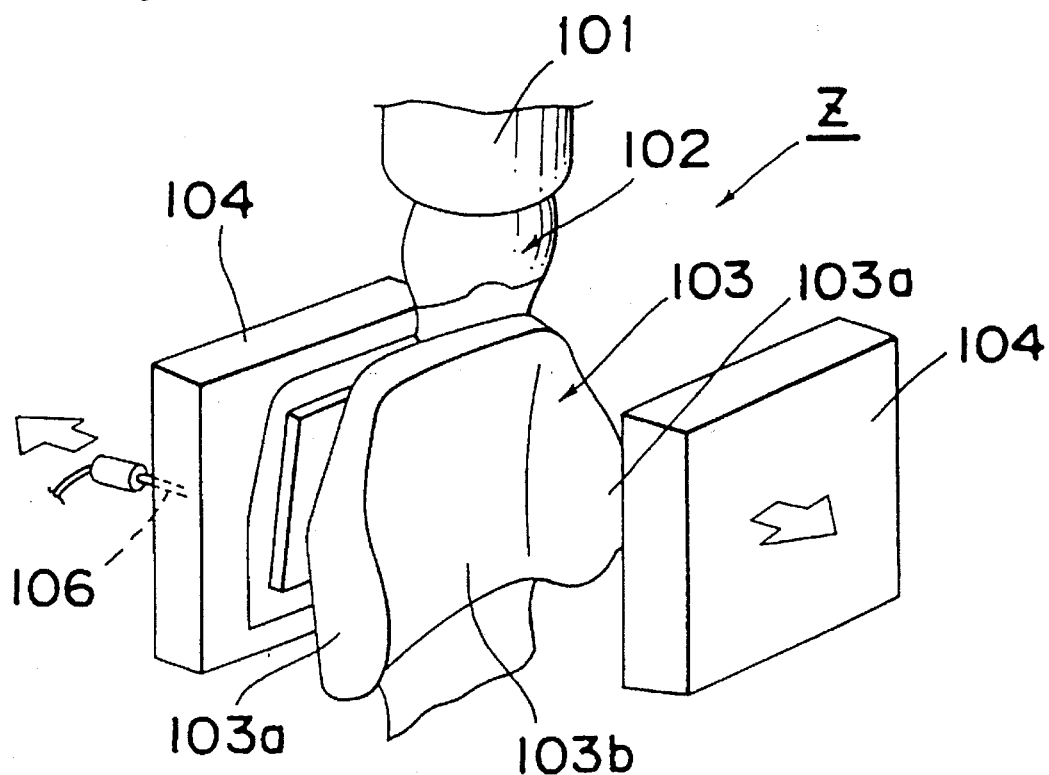
FIG. 24 is a perspective view showing a state change in FIG. 21.

Thereafter, as shown in FIG. 23, the molding dies 104 are closed together to accommodate the extended parison 120 within the molding space $104_a$. The blow nozzle 106 provided on the molding die 104 is projected into extended parison 120 through its wall, and a seat frame 103 having an outer shape conforming to the inner shape of the molding space $104_a$ is formed by expanding and transforming the extended parison 120 with compressed air of a predetermined pressure supplied from blow nozzle 106 (refer to FIG. 27). After completion of the molding, the molding dies 104 are opened as shown in FIG. 24 to take out the seat frame 106.

In this blow-molding, since an extended parison 120 in which the thickness at its both end portions $120_a$ is larger than in other portions $120_b$ is employed to obtain a seat frame 103 by expanding and transforming the parison, the thick portions of the parison 120 as they are constitute the expanded end portions $103_a$ of the seat frame 103 as shown in FIG. 27. Therefore, this seat frame 103 has a thickness configuration in which its expanded end portion $103_a$ is of a thick thickness and its back support portions $103_b$ are of a thin thickness. As a result, the seat frame 103 is raised, at its expanded end portions $103_a$, in the connection strength to the body by securing high rigidity, and is facilitated, at its back support portion 103b, in light weight due to thin thickness. Thus, strength performance and light weight which is the largest merit of the resinous seat frame are compatibly secured on the whole.

Further in this case, the range of both end portions $120_a$ of extended parison 120 which are formed thick by cooling from the expanding panels 110 are restricted below a certain dimension depending on not only the size of the expanding panel but also the diameter of the parison 102. Therefore, depending on the size of both expanded end portions $103_a$ of the seat frame 103 as a product, the whole area of the expanded end portion $103_a$ may not be formed thick. In this case, in the present embodiment, since the range of thick thickness formation and the thickness size can be easily adjusted by selecting a cooling mode of the parison 102 from the side of cooling air tubes 108, the present embodiment is applicable to the molding of seat frames 103 having various size of expanded end portions $103_a$, and its generality is elevated.

It is to be noted here that, although cooling air tubes 108 as the second cooling means are arranged only on the intermediate portion $120_b$ on one side of the extended parison 120 in the above embodiment, the present invention is not limited to this but also includes the case where cooling air tubes 108 are confrontingly arranged on the other intermediate portion $120_b$ as well. Furthermore, in this embodiment, although the portion corresponding to the contact surface $110_a$ of the expanding panel 110 for the parison 102 is cooled by cooling water and the portion not corresponding to the expanding panel 110 is cooled by air, the present invention is not limited to this, but, water cooling or air cooling both may be adopted for cooling these portions.

Furthermore, although respective air cooling tubes 108 are arranged stationarily in the above third embodiment, the present invention is not limited to this. For example, respective cooling air tubes 108 may be moved with a certain speed difference to the expanding panels 110. Furthermore, cooling air tubes 108 may be arranged, for example, in the inner side of parison 102, except for arranging outside the parison 102 as in the above embodiment.

Furthermore, in the third embodiment, although the parison 102 is extended from its inner side by arranging respective expanding panels 110 inside the parison 102 and with the outside surface of each expanding panel 110 in the parting direction being made the contact surface 110a, the present invention is not limited to this, but may also be constructed such that, for example, parison 102 is extended by holding the parison from the outer periphery side thereof with the inner side surface in the approaching or parting direction of each expanding panel 110 being made the contact surface $110_a$. Or, each expanding panel 110 could be divided into two parts in the direction normal to the approaching or parting direction, to make the confronting surfaces as the contact surfaces 110a, and the parison 102 could be extended by clamping the outer and inner peripheral sides with contact surfaces $110_a$.

Subsequently, a modification of the third embodiment will be described below.

Although this third embodiment is arranged so that the portion of the parison 102 corresponding to the contact portion $110_a$ of the expanding panel 110 is cooled by cooling water supplied into the expanding panel 110 and the other portion not corresponding to expanding panel 110 is cooled by cooling air supplied from the cooling air tubes 108 as described above, the present modification is arranged so that both portions are cooled by cooling air to effect the thickness adjustment.

In other words, although the left and light pair of cooling air tubes 8 as the second cooling means are of the same construction as in the first embodiment as shown by the full line FIG. 26, the first cooling means for cooling the portion corresponding to the contact surface $110_a$ of the expanding panel 110 is, as indicated by the chain line in FIG. 26, constructed so that a plurality of cooling air tubes 109 (in the present embodiment, 7 tubes, respectively) are arranged in the circumferential direction with respective air outlet ports being directed toward contact surface $110_a$ in the outer side of the contact surface $110_a$ of the expanding panel 110 at a predetermined distance therefrom. Air cooling tubes 109 can be integrally moved in conjunction with the approaching and parting motion of expanding panels 110 while maintaining the predetermined relations to expanding panels 110 (refer to symbols 109' in FIG. 26).

In the extending process of the parison 102 by the expanding panels 110, the portions of the parison 102 corresponding to respective contact surfaces $110_a$ of the expanding panels 110 are forcibly cooled from the outside thereof by cooling air ejected from cooling air tubes 109 moving integrally with contact surfaces $110_a$ and formed in approximately constant thick thickness. On the other hand, one portion not corresponding to contact surfaces $110_a$ is extended to gradually decrease thickness properly while being sequentially cooled by cooling air ejected from respective cooling air tubes 108 disposed stationarily on one side of expanding panels 110, whereby an extended parison 120 of varied thickness structure is formed.

When the first cooling means is constituted by the air cooling system composed of a plurality of air cooling tubes 109, as described above, even when the size of the contact surface $110_a$ of the expanding panel 110 is constant, the length of the thickest portion can be adjusted to increase or decrease by adjusting the arrangement number, arrangement range of the cooling air tubes 109, or adjusting the number of tubes actually contributing to cooling action among these cooling air tubes 109. Therefore, the modification may be applicable to manufacturing larger kinds of seat frames as compared to the third embodiment, and its generality is further improved.

It is to be noted that, although the cooling air tubes 109 are arranged to be moved integrally with the expanding panels 110 in the present modification, the cooling air tubes 109 are not necessarily required to be moved integrally with the expanding panels 110 but cooling air tubes 109 may be moved at a predetermined speed difference relative to the expanding panels 110.

Subsequently, another modification of the third embodiment is described below.

Figure 28:
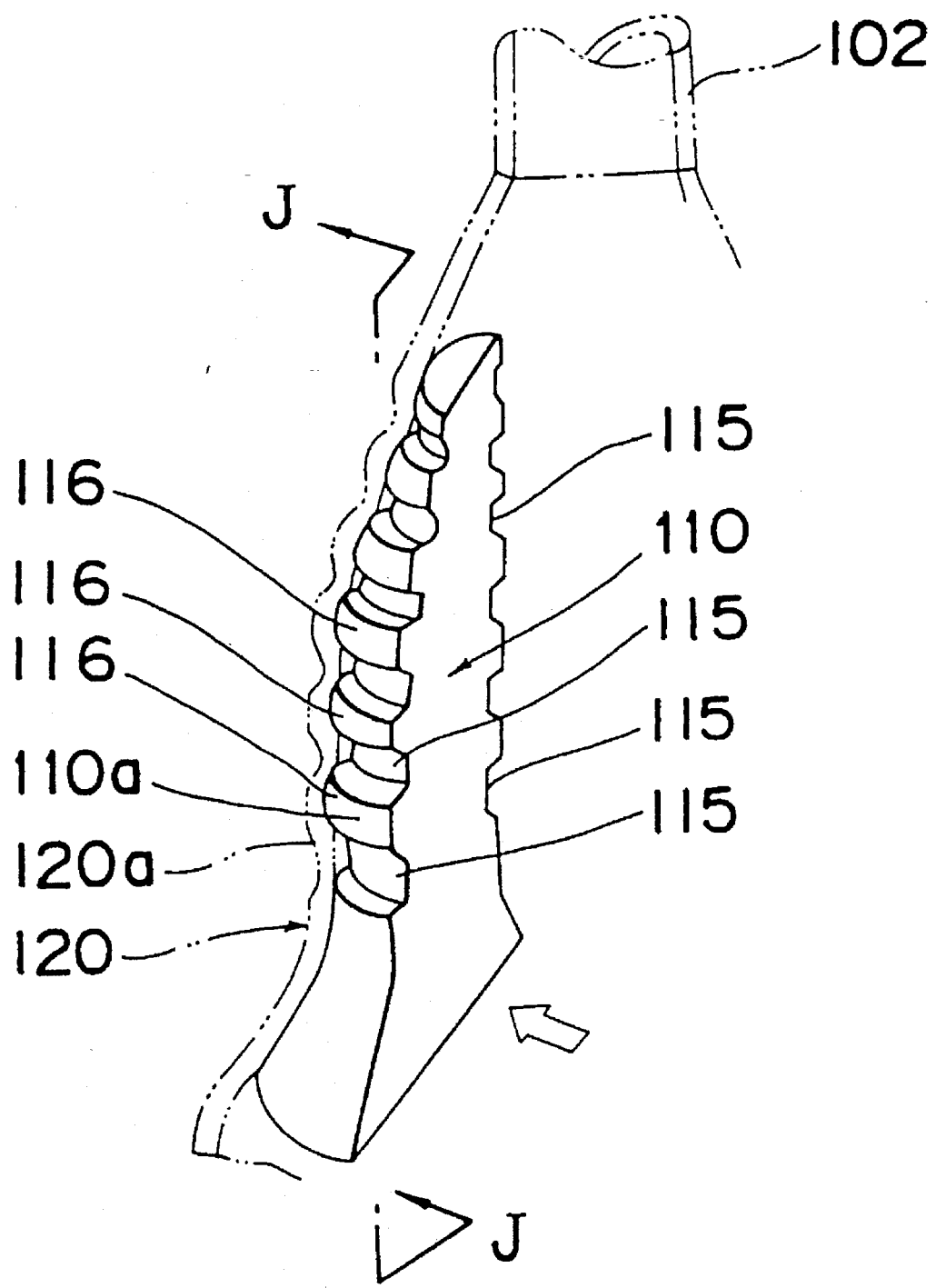
FIG. 28 is a perspective view of an essential portion of a blow-molding apparatus according to another modification of the third embodiment of the present invention.
Figure 29:
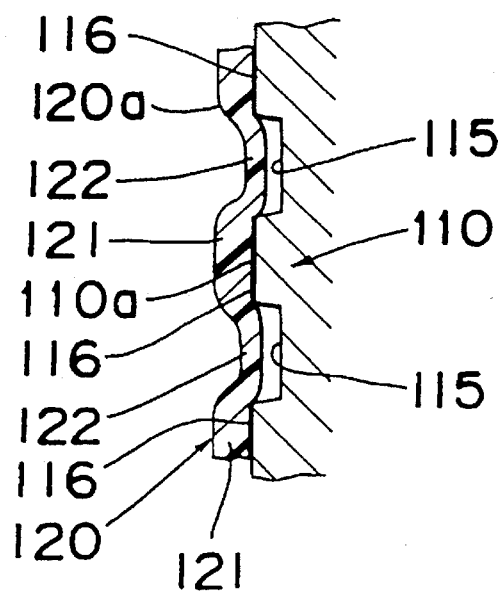
FIG. 29 is an enlarged sectional view along line J—J in FIG. 28.

FIGS. 28 and 29 show an expanding panel 110 (only one of the expanding panels is shown)employed in a blow-molding apparatus according to another modification of the third embodiment. This expanding panel 110 is formed with lateral grooves 115 extending in the circumferential direction at a predetermined spacing on the contact surface $110_a$, in contrast with the expanding panel 110 having a flat contact surface in the third embodiment and convex stripe portions comprised of contact surface $110_a$, which are present between adjacent grooves 115, are made respective remaining surface portions 116.

When an extended parison 120 is formed by extending a parison 102 by the use of the expanding panel 110 constructed as described above, among remaining surface portions 116 and lateral grooves 115 of expanding panel 110, since remaining surface portions 116 first contact the inner surface of the parison 102, portions corresponding to respective remaining surface portions 116 are positively cooled to be lowered in fluidity and remain comparatively thick in thickness. On the contrary, since the portions corresponding to respective grooves 115 are left non-contacted or contacted after being pulled to the groove 115 side by the extension in the circumferential direction of the extended parison 120, they are extended larger than the portion corresponding to the remaining surface portions 116 to become comparatively thin in thickness. As a result, both end portions $120_a$ of the extended parison 120 corresponding to the expanding panel 110 are brought into a convex and concave rugged state wherein thick portions 121 and thin portions 122 are alternately arranged.

Figure 30:
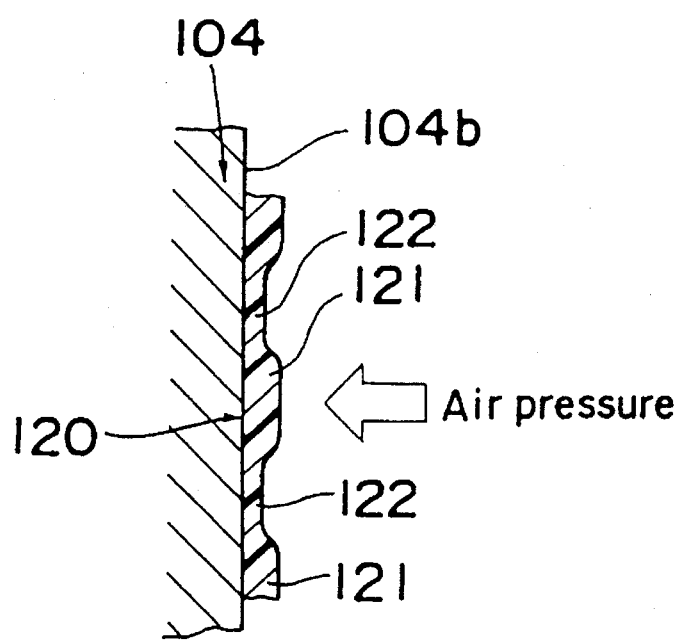
FIG. 30 is a drawing showing a state change in FIG. 27.

When blow-molding is effected by the molding dies 104 through employment of the extended parison 120 formed as described above, since the molding surface $104_b$ of the molding die 104 is formed flat as shown in FIG. 30, the outer surface of the extended parison 120 is formed flat by being pressed against the molding surface $104_b$ by air pressure and the inner surface becomes rugged. Therefore, the seat frame 103 as a product has a plurality of beads laterally extending at the inner surface of the expanded end portions $103_a$, and as the synergistic effect of the presence of the beads and thick thickness, the rigidity of the expanded end portions $103_a$ is further increased.

Next, still another modification of the third embodiment will be described below.

Figure 31:
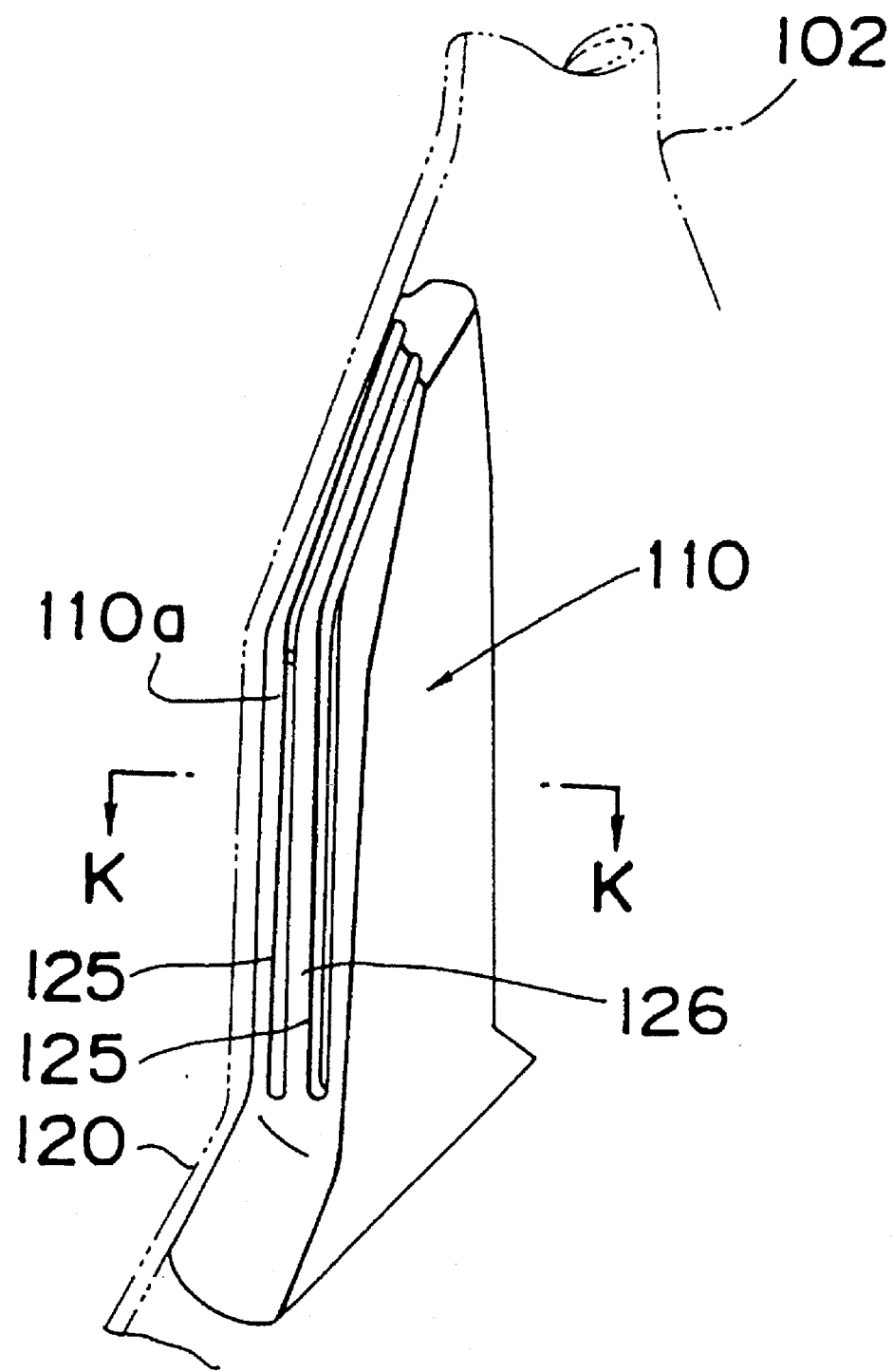
FIG. 31 is a perspective view of an essential portion of a blow-molding apparatus according to still another modification of the third embodiment of the present invention.

FIG. 31 shows an expanding panel 110 employed in the blow-molding apparatus Z according to still another modification of the third embodiment of the present invention. In contrast with the modification shown in FIGS. 28 to 30 wherein the expanding panel 110 is formed with a plurality of lateral grooves 115 on its contact surface 110a, thereby to form beads extending in the circumferential direction at both end portions of the seat frame 103. The expanding panel 110 of the present modification is formed with a plurality of longitudinal grooves 125 extending in the up-down direction on its contact surface $110_a$ (symbol 126 is a remaining surface portion).

Figure 32:
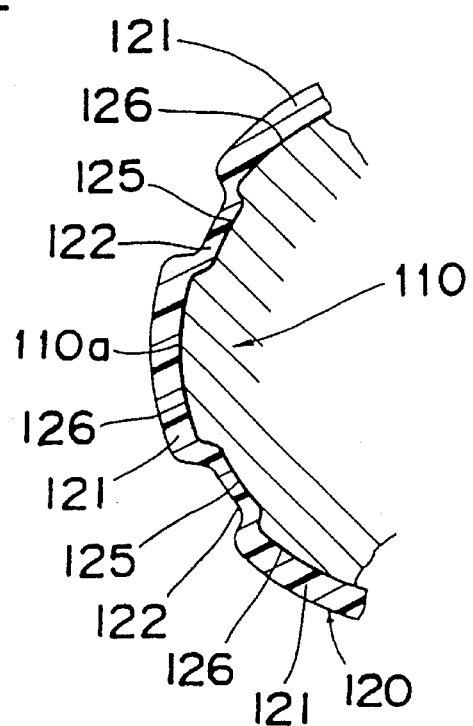
FIG. 32 is an enlarged sectional view along the line K—K in FIG. 31.
Figure 33:
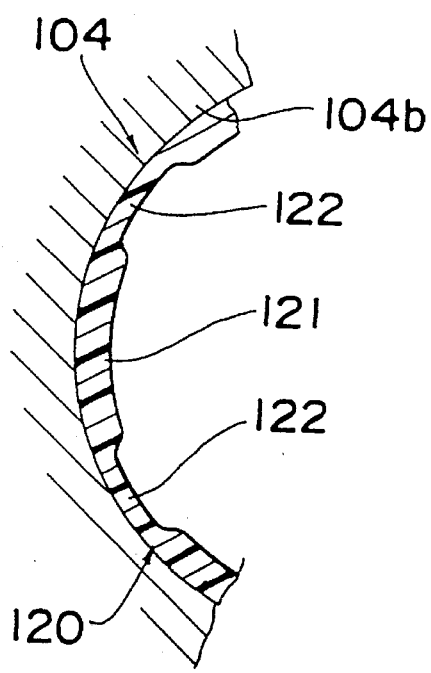
FIG. 33 is a drawing showing a state change in FIG. 32.

In the case of forming longitudinal grooves as described above and as shown in FIGS. 32 and 33, due to the difference in cooling from the contact surface $110_a$ and the longitudinal extension action of the extended parison 120, thick portions 121 extending in the up-down direction and thin portions 122 are alternately arranged on both end portions $120_a$ of the extended parison 120. As a result, in the seat frame 103, a plurality of beads are formed in the longitudinal direction on the inner surface of both expanded end portions $103_a$, and the rigidity of the expanded end portions $103_a$ is further increased.

It is to be noted that respective modifications shown in FIGS. 28 through 33 are applicable effectively not only to the expanding panel employed in the third embodiment but also to that employed in the first embodiment, the second embodiment, or the fourth embodiment to be described later, and contribute to the improvement of rigidity the respective molding products.

[Embodiment 4]

Next, a fourth embodiment of the present invention is described below.

The molding apparatus according to the fourth embodiment is intended to improve the freedom of setting the thick thickness range in blow-molding a molding product in which a specified portion thereof is formed thick through extending in a flat shape.

Furthermore, since the fourth embodiment molds the same seat frame as in the above third embodiment, temperature conditions and the like of the parison and the molding dies are set in the same way as in the third embodiment. The molding process is the same as in the first embodiment except for a part thereof. Therefore, in the following explanation, descriptions of the same portions as in the third embodiment are omitted to avoid duplication.

Figure 34:
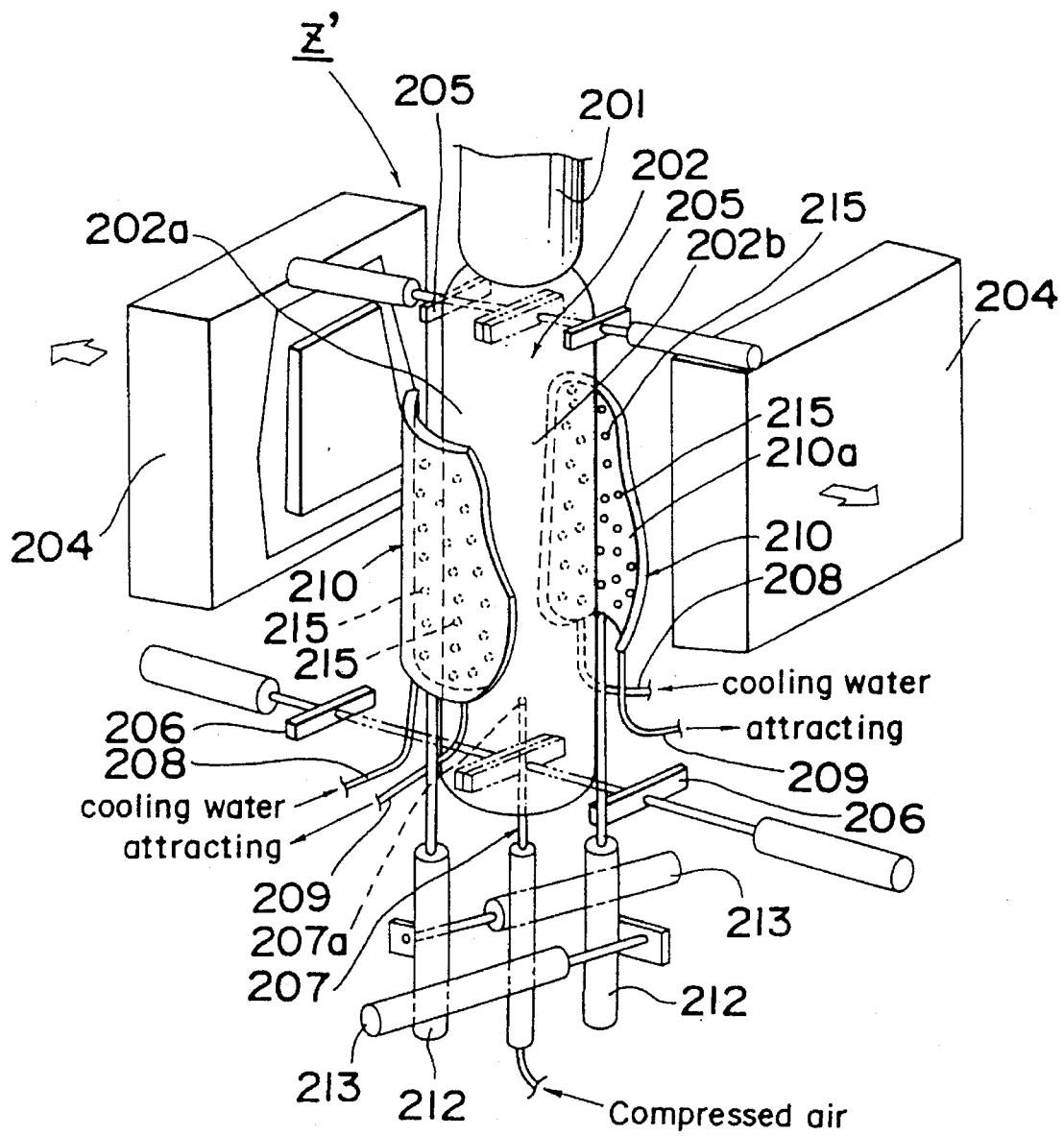
FIG. 34 is a perspective view of a blow-molding apparatus according to a fourth embodiment of the present invention.

FIG. 34 shows a blow-molding apparatus Z' according to the fourth embodiment of the present invention. The blow-molding apparatus Z' includes an extruder 201, a pair of molding dies 204, a pair of upper pre-pinching panels 205, a pair of lower pre-pinching panels 205, a pair of expanding panels 210, suction tubes 209 as a parison attracting means, cooling water tubes 208 as a temperature conditioning means, and a blow nozzle as a compressed air supply means.

Upper pre-pinching panels 205 are constructed by plate members confrontingly disposed right under the extruder 201 to hold a parison 202 therebetween in the radial direction and to be able to approach or part from each other. In the approach state, as shown in FIG. 36, they are arranged to tighten the upper end portion of parison 202, correctly, the upper end portion of the extended parison 220 to be described later from both sides to form a seal.

Lower pre-pinching panels 206 are constructed by plate members confrontingly disposed below molding dies 204 to hold parison 202 in the radial direction therebetween and to be able to approach or part from each other. In the approach state, as shown in FIG. 36, they are arranged to tighten the lower end portion of parison 202, namely, the lower end portion of the extended parison 220 to be described later to form a seal.

Figure 36:
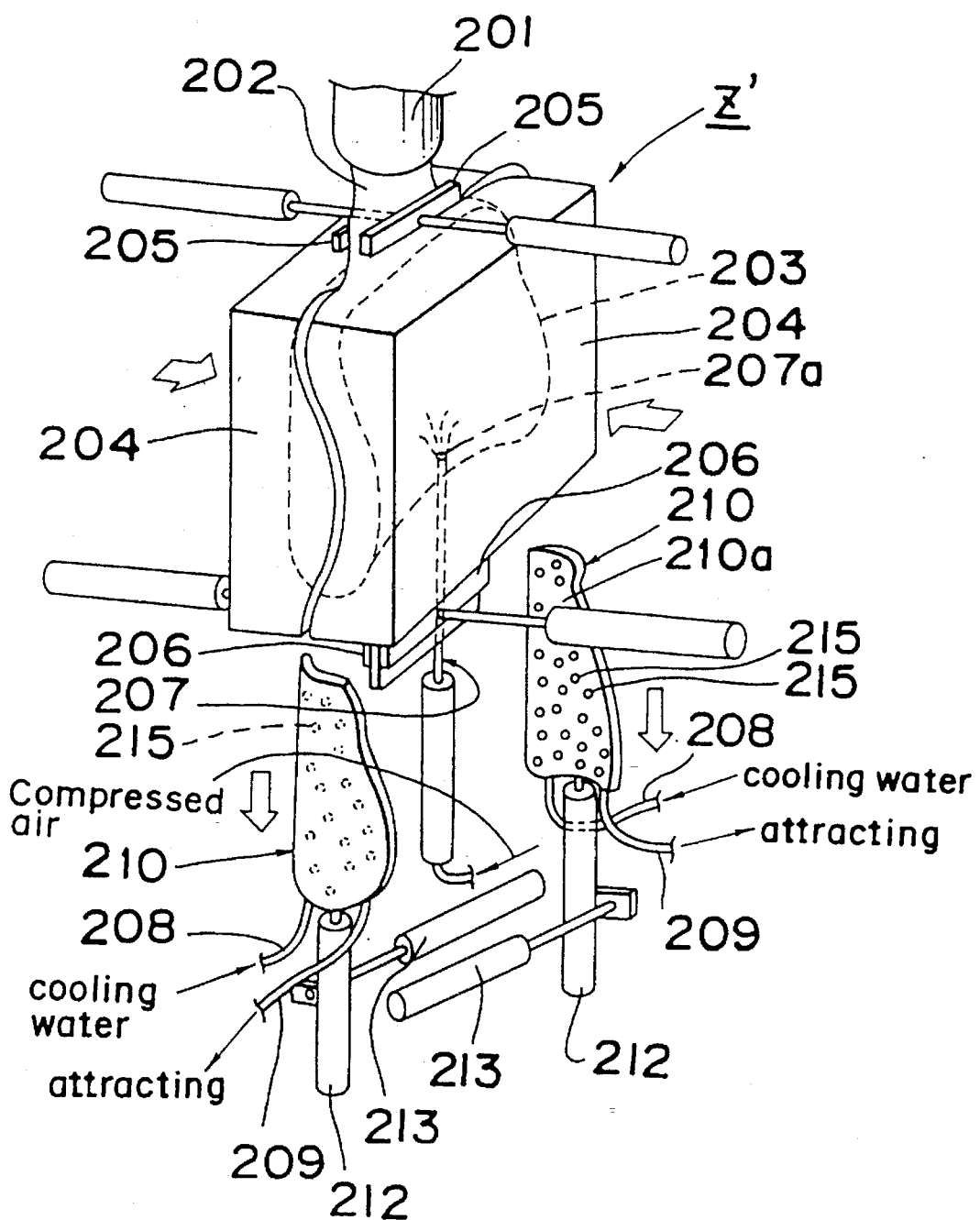
FIG. 36 is a drawing showing a state change in FIG. 34.
Figure 37:
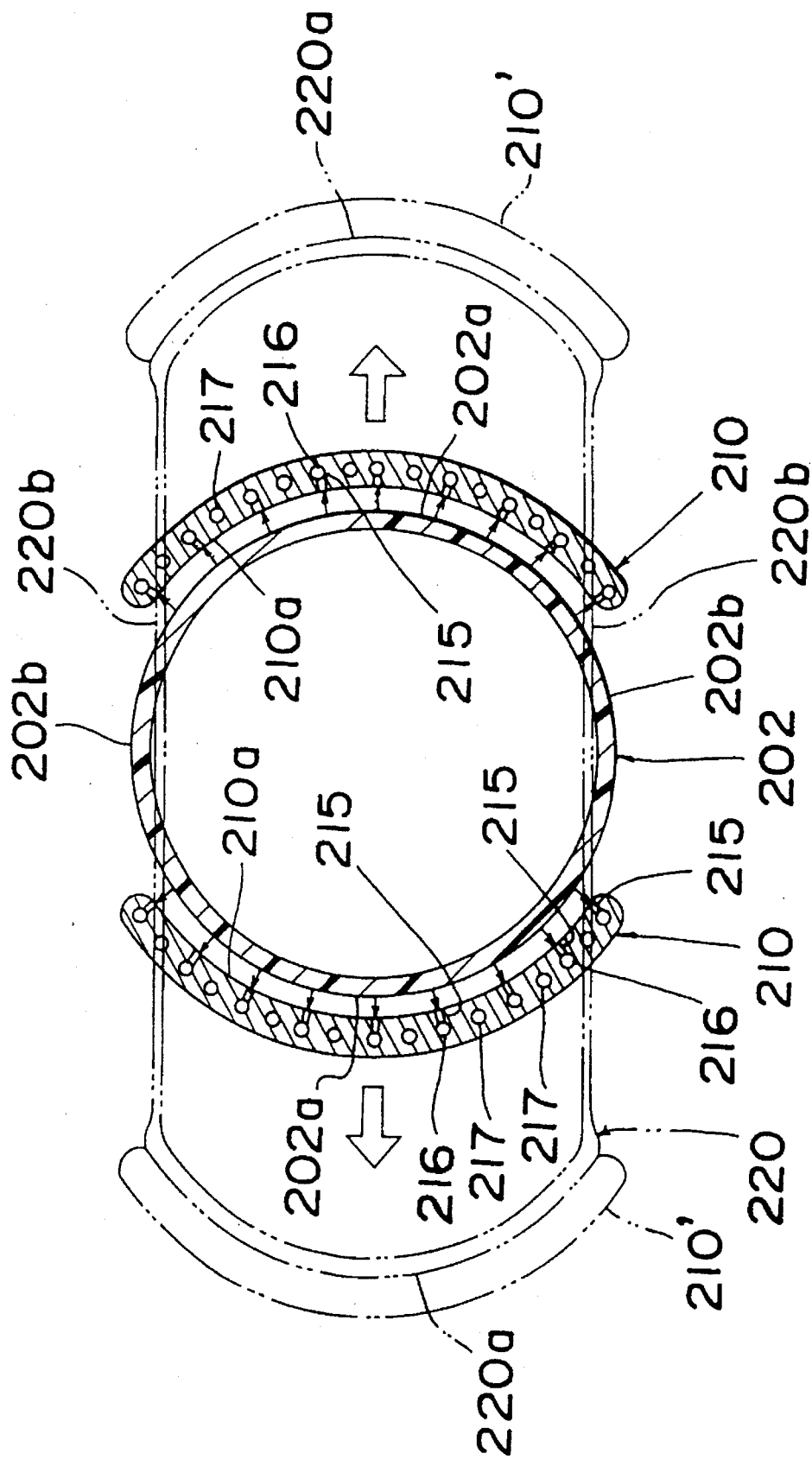
FIG. 37 is an explanatory drawing of the molding states in FIGS. 34 and 35.
Figure 38:
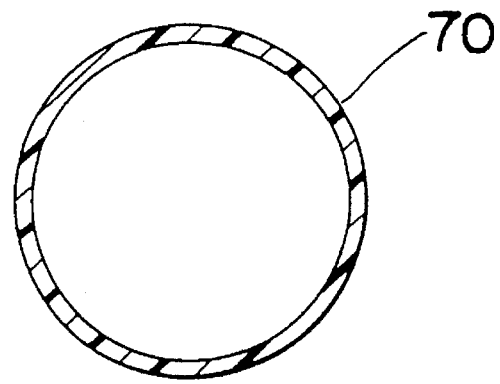
FIG. 38 is an explanatory drawing showing a part of the molding process by a molding apparatus according to a conventional art.
Figure 39:
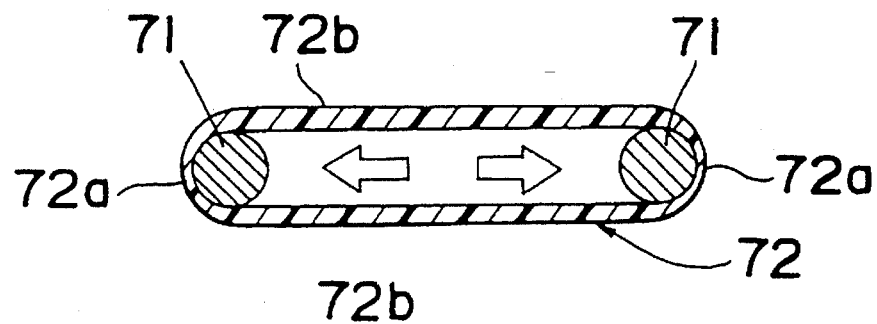
FIG. 39 is an explanatory drawing showing a part of the molding process according to a conventional art.
Figure 40:
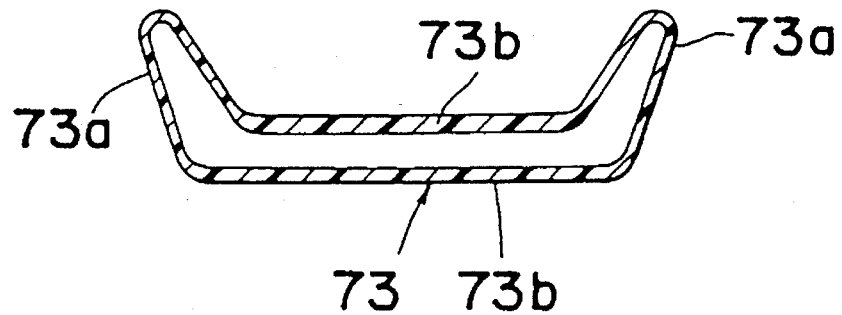
FIG. 40 is an explanatory drawing showing a part of the molding process according to a conventional art.
Figure 41:
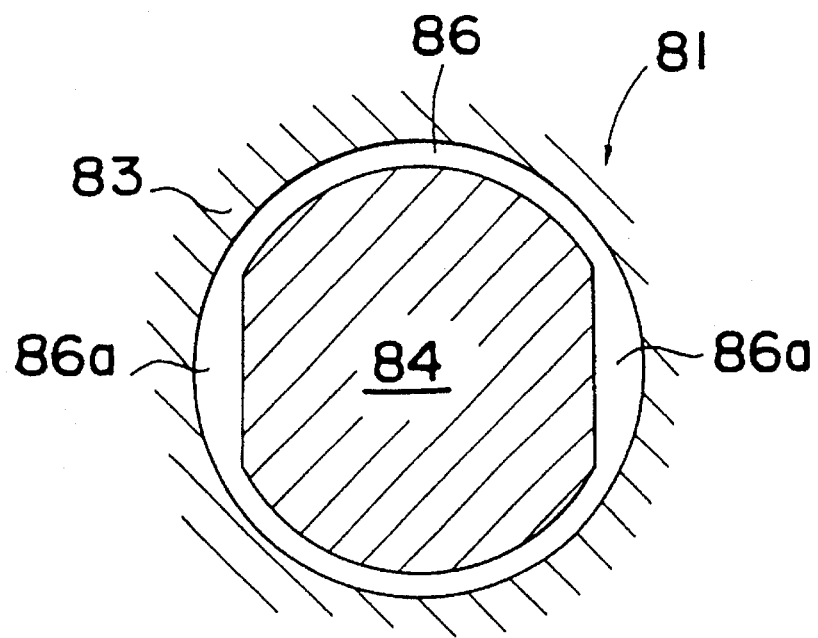
FIG. 41 is an explanatory cross-sectional view of a conventional shaved accumulator head.
Figure 42:
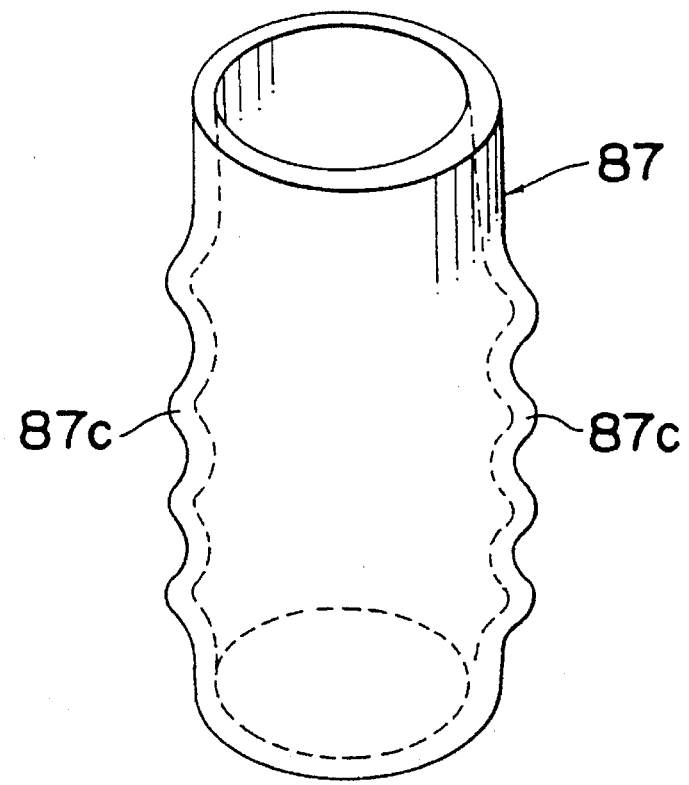
FIG. 42 is a perspective view showing an undulated parison according to another conventional art.
Figure 43:
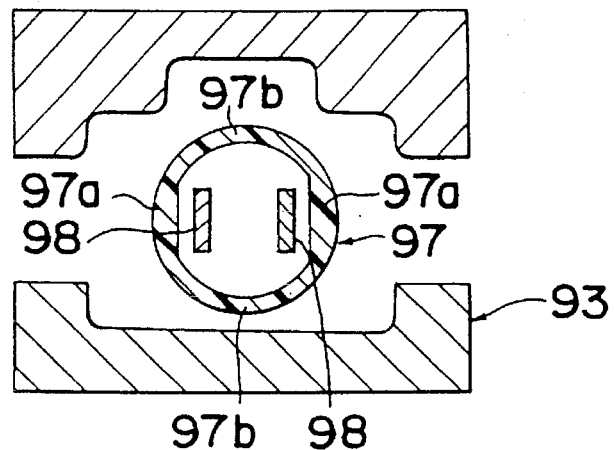
FIG. 43 is an explanatory cross-sectional view showing the parison extrusion process in the blow-molding method according to still another conventional embodiment.
Figure 44:
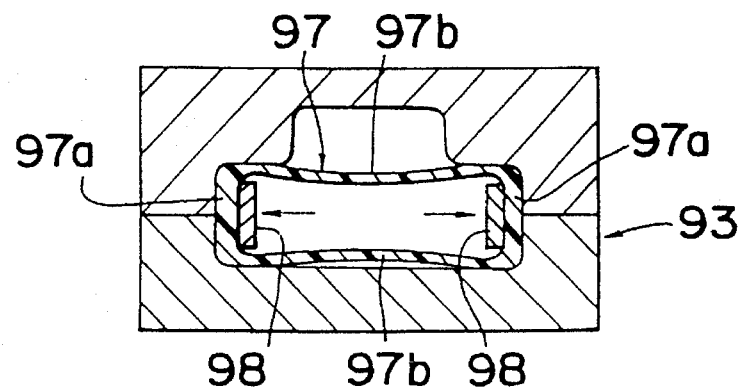
FIG. 44 is an explanatory cross-sectional view of the parison extension process in the blow-molding method according to the still another conventional embodiment.
Figure 45:
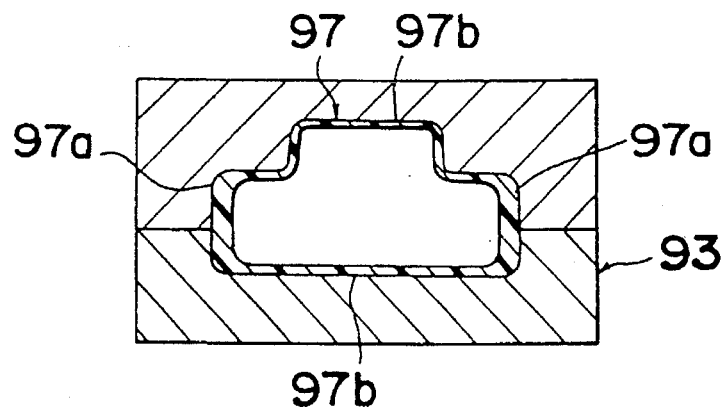
FIG. 45 is an explanatory cross-sectional view of the air blowing process in the blow-molding method according to the still another conventional embodiment.

Expanding panels 210, as shown in FIGS. 36 and 37, are integrally constructed by plate-shaped members of a certain thickness which are bent to conform to the outer peripheral shape of parison 202. The developed shape thereof is set at the shape corresponding to the range wherein the thick thickness shape of both end portions $203_a$ of the seat frame 203 to be manufactured is required.

Meanwhile, expanding panel 210 employs its bent inner surface as the contact surface $210_a$, and on the contact surface $210_a$, there are opened a large number of suction ports 215, as shown in FIGS. 36 and 37. Suction ports 215 are respectively communicated to the suction tube 209 through suction passages 216 formed in the expanding panel 210. By sucking through the suction tube 209 with a vacuum pump (not shown), a suction force of a predetermined strength is applied to contact surface $210_a$ over the entire surface.

Furthermore, within expanding panel 210, there are also formed cooling water passages 217 communicating with the cooling water tube 208, and the surface temperature of the contact surface $210_a$ is at all times controlled at a proper temperature, concretely at 3° to 6° C. which is lower than the temperature of the parison 202. The pair of expanding panels 210 constructed as described above are respectively confrontingly arranged with their contact surfaces $210_a$ being directed inward and can be lifted or lowered in the direction parallel to the axial line of extruder 201 by lifting cylinders 212 and can be moved in the approaching or parting direction by slide cylinders 213 installed on respective lifting cylinders 212.

Furthermore, expanding panels 210 are positioned in the vertical direction to overlap the outer sides of the parison 202 by a predetermined height as shown in FIG. 34 in the lifted state, and to be positioned below the lower end of parison 202 as shown in FIG. 36 in the lowered state. The position of the expanding panel 210 in the radial direction of the parison 202 is set to approach the outer side of the parison 202 as indicated by the full line in FIG. 36 in the approaching state, and to be parted larger than the diameter size of the parison 202 as indicated by the chain line in FIG. 36 (refer to symbol 210') in the parted state.

Blow nozzle 207 is arranged directed upward almost coaxially below extruder 201 and its tip end $207_a$ is set in height so as to protrude into the molding space $204_a$ in the closed state of the molding dies 204.

Subsequently, the operation sequence and operation effect in the case of molding a seat frame 203 trough employment of blow-molding apparatus Z' will be described below.

(a) Extrusion of a parison 202:

In the first place, as shown in FIG. 34, the molding dies 204 are opened and upper pre-pinching panels 205 and lower pre-pinching panels 206 are respectively parted from each other. The expanding panels 210 are set at the lifted positions in the approaching state. In this state, extruder 201 is activated to extrude a parison 202 set to the same dimensions (diameter and thickness) as in the third embodiment by a proper length in the hang-down state and position parison 202 on the inner side of expanding panels 210.

As an operating method for positioning parison 202 on the inner side of expanding panels 210, a method of extruding a parison 202 downward in the state where expanding panels 210 are set at the lowered positions and then lifting expanding panels 210 so as to position the parison 202 therebetween may be adopted.

Furthermore, in the state where parison 202 is extruded downward, the tip end portion $207_a$ of the blow nozzle 207 is entered into parison 202 by a predetermined amount.

(b) Extension of the parison 202:

Next, the upper pre-pinching panels 205 and the lower pre-pinching panels 206 are respectively caused to approach each other to seal parison 202 at upper and lower two positions in a sealed bag form. In this state, blow nozzle 207 is projected into parison 202 through a gap between lower pre-pinching panels 206.

In this state, the temperature adjustment of the contact surface $210_a$ of the expanding panel 210 is effected by cooling water and the vacuum pump is operated to apply suction force of a predetermined strength to contact surface $210_a$. Then, the portions $202_a$ of the outer peripheral surface respectively corresponding to the contact surfaces $210_a$ of expanding panels 210 are attracted to contact surfaces $210_a$ by the suction force and held in contact therewith.

Figure 35:
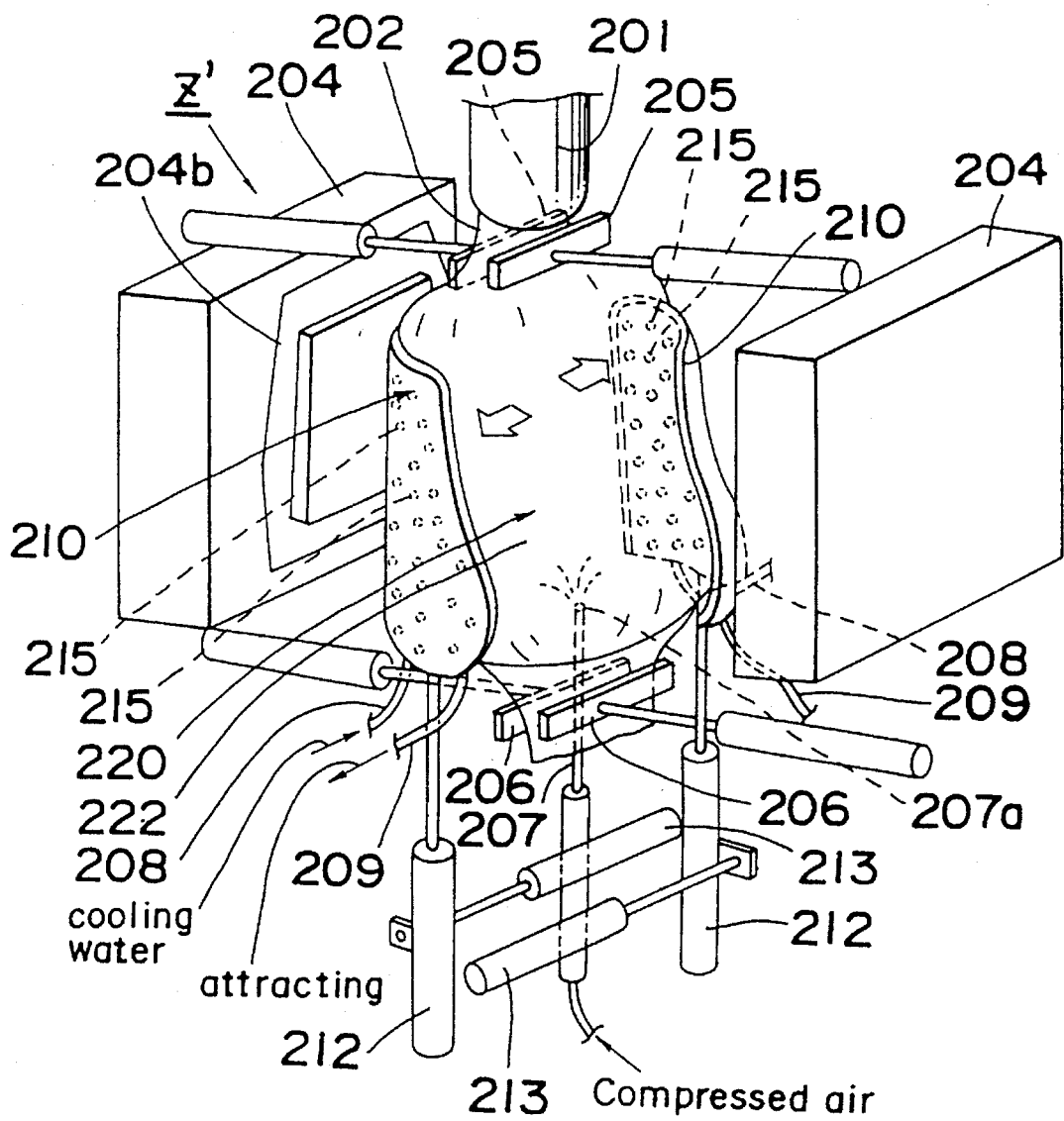
FIG. 35 is a drawing showing a state change in FIG. 34.

Furthermore, in the state where both sides of the parison 202 are held by the expanding panels 210, as shown in FIG. 35, expanding panels 210 are parted from each other by the slide cylinders 213 while properly supplying compressed air into the parison 202 from nozzle 207. Then, the parison 202 is extended in the lateral direction by the tensile force accompanying the parting motion of the expanding panels 210 and the expansion action of the compressed air supplied therein, and formed into an extended parison 220 having a flat tubular section as indicated by chain lines in FIG. 37. The extended state is set the same, for example, as in the case of the third embodiment.

Meanwhile, in the case of forming an extended parison 220 by extending a parison 202 by expanding panels 210 in this manner, since the portions $202_a$ of the parison 202 sucked onto the contact surfaces $210_a$ of expanding panels 210 and held in contact therewith are positively cooled by contact surface $210_a$ of low temperature, solidification is earlier expedited and fluidity is lowered at portions. Therefore, these portions $202_a$ corresponding to contact surfaces $210_a$ extend not much despite the extension action of the expanding panels 210 but are held comparatively thick in thickness.

On the other hand, the intermediate portions $202_b$, not contacting expanding panels 210 are positively extended under the extension action of the expanding panels 210 to become thin in thickness, because high fluidity is maintained for a long time at these portions $202_b$. As a result, the extended parison 220 molded by this extending process has such a varied thickness structure that the thickness at both end portions $220_a$ is the largest (4.5 to 5.5 mm) and maintained at almost constant thickness, while that at the intermediate portions $220_b$, $220_b$ is thinner (2.0 to 2.2 mm).

(c) Blow-molding:

After parting expanding panels 210 from each other up to the predetermined position to form the extended parison 220, by releasing the suction force at contact surfaces $210a$, respective expanding panels 210 and the extended parison 220 are separated from each other and expanding panels 210 are moved from the lifted positions to the lowered positions as shown in FIG. 36.

Thereafter, the molding dies 204 are closed to accommodate extended parison 220 in the molding space $204_a$, and by supplying compressed air from blow nozzle 207, extended parison 220 is further expanded and transformed to mold a seat frame having the outer shape conforming to the inner shape of molding space $204_a$. After molding, by opening the molding dies 204, the seat frame is taken out and thus, the blow-molding process is completed.

As described so far, in the blow-molding method such as the present embodiment, since a seat frame is obtained by employing an extended parison 220 wherein the thickness at both end portions $220_a$ is thicker than at other portion $220_b$, and expand-transforming parison 220, the thick portion of the extended parison 220 constitutes, as it is, the expanded end portion of the seat frame, as in the case of the third embodiment. Therefore, the seat frame has such a thickness structure that its expanded end portion is formed thick and the back support portion is formed thin. As a result, the strength performance and the light weight which is the largest merit of a resinous seat frame are secured consistently on the whole.

On the other hand, in the case of arranging the expanding panels 210 on the inside of the parison 202, since the length in the circumferential direction of each end portion $220_a$ remove is restricted to less than a certain dimension by the size of the expanding panel 210 and thus, by the diametral dimension of the parison 202, it may be that the expanded end portion can not be formed thick throughout the entire area, depending on the size of the expanded end portion of the seat frame as the molding product. However, in the present embodiment, since expanding panels 210 are arranged on the outer side of the parison 202, the size of the expanding panels 210 is less restricted by the diametral dimension of the parison 202 and the shape and dimensions thereof can be set comparatively freely. Therefore, the present blow-molding apparatus is applicable to molding seat frames having expanded end portions of various sizes and the generality thereof is increased that much.

It is to be noted here that the arrangement of disposing the expanding panels on the outer side of the parison is applicable to respective cases of the first to third embodiments, and the same effect as the above can be exhibited in respective cases.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A blow-molding method for resinous molding products having thick portions and thin portions, the method comprising the steps of:

hanging down a parison in a first direction between a pair of metallic molds which are free to open or close together, the parison having a predetermined cross section and a first temperature;

contacting first portions of the parison with at least one pair of expanding members, the first portions at least partially corresponding to the thick portions after molding, the parison also having second portions at least partially corresponding to the thin portions after molding, the expanding members being movable in a second direction different from the first direction and the second direction being a direction in which said parison expands by blow molding;

providing said expanding member with a temperature conditioning means and adjusting said first portions of said parison to a second temperature that is lower than said first temperature by contacting said first portions of said parison with said expanding members, said temperature conditioning means being controlled by a controlling means for setting a temperature difference between said first temperature and said second temperature;

setting said temperature difference between said first temperature and said second temperature in accordance with a preset thickness ratio between said thick portions and the thin portions of said resinous molding product, said ratio being achieved after molding said first portions into said thick portions and molding said second portions of the parison into said thin portions;

extending said second portion by moving the expanding members up to intermediate positions before the first portions come into contact with molding surfaces of the metallic molds; and subsequently heating said first portions contacted by said expanding members until the temperature thereof reaches a predetermined temperature; and thinning said second portions of said parison by moving the expanding members in said second direction and closing together said pair of metallic molds and blowing compressed air into said parison so as to conduct blow-molding.

2. A blow-molding method for resinous molding products in accordance with claim 1, wherein the parison is a varied thickness parison which is varied in thickness in a circumferential direction and has thick portions, and said expanding members contact the thick portions of the varied thickness parison.

3. A blow-molding method for resinous molding products in accordance with claim 1, wherein the parison is an uniform thickness parison which is formed approximately uniform in thickness in a circumferential direction and said temperature difference is set to be larger than where the parison is a varied thickness parison.

4. A blow-molding method for resinous molding products in accordance with claim 1, wherein said temperature conditioning means is provided with a heating means for heating the first portions contacted by the expanding members, a cooling means for cooling the first portions and a switching means for switching the operations of both the heating and the cooling means, the switching means being arranged to switch the operating states of the both means so that the cooling means is operated until an extension process of the second portion is completed, and the heating means is operated upon completion of the extension process.

5. A blow-molding method for resinous molding products in accordance with claim 1 wherein the parison is an uniform thickness parison in which the thickness of the parison is approximately uniform in a circumferential direction.

6. A blow-molding method for resinous molding products in accordance with claim 1, wherein in thinning said second portions, the thickness of said second portions is adjusted by cooling said second portions.

7. A blow-molding method for resinous molding products in accordance with claim 1, wherein said first portions of said parison contacted by expanding members are provided with a plurality of bead portions extending in a predetermined direction.

8. A blow-molding method for resinous molding products having thick portions and thin portions, the method comprising the steps of:

hanging down a parison in a first direction between a pair of metallic molds which are free to open or close together, said parison having a predetermined cross section and a first temperature;

contacting first portions of said parison with at least one pair of expanding members, said first portions at least partially corresponding to said thick portions after molding, said parison also having second portions at least partially corresponding to said thin portions after molding, said expanding members being arranged on an outer surface of said parison and being movable in a second direction different from said first direction and said second direction being a direction in which said parison expands by blow molding;

providing the expanding member with a temperature conditioning means and adjusting said first portions of said parison to a second temperature that is lower than said first temperature by contacting said first portions of said parison with said expanding members, said temperature conditioning means being controlled by a controlling means for setting a temperature difference between said first temperature and said second temperature;

setting the temperature difference between said first temperature and said second temperature in accordance with a preset thickness ratio between said thick portions and said thin portions of said resinous molding product, said ratio being achieved after molding said first portions into said thick portions and molding said second portions of the parison into said thin portions;

extending said second portion by applying suction through suction means in said expanding members to hold said parison against said expanding members and moving said expanding members up to intermediate positions before said first portions come into contact with molding surfaces of the metallic molds; and subsequently heating said first portions contacted by said expanding members until the temperature thereof reaches a predetermined temperature; and thinning said second portions of said parison by applying suction to said expanding members to hold said parison against said expanding members and moving said expanding members in said second direction and closing together said pair of metallic molds and blowing compressed air into said parison so as to conduct blow-molding.

9. A blow-molding method for resinous molding products having thick portions and thin portions, the method comprising the steps of:

hanging down a parison in a first direction between a pair of metallic molds which are free to open or close together, said parison having a predetermined cross section and a first temperature;

contacting first portions of said parison with at least one pair of expanding members, said first portions at least partially corresponding to said thick portions after molding, said parison also having second portions at least partially corresponding to said thin portions after molding, said expanding members being movable in a second direction different from said first direction and said second direction being a direction in which said parison expands by blow molding;

providing said expanding member with a temperature conditioning means and adjusting said first portions of said parison to a second temperature that is lower than said first temperature by contacting said first portions of said parison with said expanding members, said temperature conditioning means being controlled by a controlling means for setting a temperature difference between said first temperature and said second temperature;

wherein said temperature conditioning means is provided with a heating means for heating said first portions contacted by said expanding members, a cooling means for cooling said contact surface portions and a switching means for switching the operations of both said heating and said cooling means switching the operating states of said heating and cooling means so that said cooling means is operated until an extension process of said second portions is completed, and said heating means is operated upon completion of the extension process;

setting said temperature difference between said first temperature and said second temperature in accordance with a preset thickness ratio between said thick portions and said thin portions of said resinous molding product, said ratio being achieved after molding said first portions into said thick portions and molding said second portions of the parison into said thin portions;

thinning said second portions of said parison by moving said expanding members in said second direction; and closing together said pair of metallic molds and blowing compressed air into said parison so as to conduct blow-molding.

* * * * *